United States Patent
Stripling et al.

(10) Patent No.: US 9,442,795 B2
(45) Date of Patent: Sep. 13, 2016

(54) SYSTEM AND METHOD FOR ARCHIVE VERIFICATION USING MULTIPLE ATTEMPTS

(71) Applicant: KIP CR P1 LP, New York, NY (US)

(72) Inventors: Jeffrey Ricks Stripling, Austin, TX (US); Robert C. Sims, Round Rock, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

(21) Appl. No.: 14/092,729

(22) Filed: Nov. 27, 2013

(65) Prior Publication Data

US 2014/0085744 A1    Mar. 27, 2014

Related U.S. Application Data

(63) Continuation of application No. 12/861,612, filed on Aug. 23, 2010, now Pat. No. 8,631,281.

(60) Provisional application No. 61/287,124, filed on Dec. 16, 2009.

(51) Int. Cl.
*G06F 11/00* (2006.01)
*G06F 11/08* (2006.01)
(Continued)

(52) U.S. Cl.
CPC ........... *G06F 11/08* (2013.01); *G06F 11/1448* (2013.01); *G06F 11/2221* (2013.01);
(Continued)

(58) Field of Classification Search
CPC .............. G11B 20/02; G11B 2220/20; G11B 20/1883; G11C 29/56; G06F 11/0727
USPC ............................................... 714/42; 360/53
See application file for complete search history.

(56) References Cited

U.S. PATENT DOCUMENTS

| | | | |
|---|---|---|---|
| 3,704,363 | A | 11/1972 | Salmassy et al. |
| 3,984,923 | A | 10/1976 | Rawson et al. |

(Continued)

FOREIGN PATENT DOCUMENTS

| | | |
|---|---|---|
| EP | 0726570 | 8/1996 |
| GB | 2419198 | 4/2006 |

OTHER PUBLICATIONS

Weber, Ralph O. (ed.) Information Technology—SCSI Primary Commands—4 (SPC-4), Project T10/1731-D, Working Draft, rev. 2, Sep. 15, 2005, ENDL Texas, Dallas, TX, 499 pgs.

(Continued)

*Primary Examiner* — Yair Leibovich
(74) *Attorney, Agent, or Firm* — Sprinkle IP Law Group

(57) ABSTRACT

Systems, methods and apparatus for archive verification including the verification of media in a library, are disclosed. More specifically, a method of archive verification may include performing an initial verification on a first media in a first drive and performing a subsequent verification on the first media in a second drive not used for the initial verification, and comparing the results of the initial verification and the subsequent verification. Embodiments may further perform an initial verification of the readability of a second tape media and subsequent verification of the readability for the second tape media, and compare the results of the initial verification to the results of the subsequent verification to determine the tape drive health, the efficacy of the first tape media or the second tape media, the efficacy of the first tape drive or the second tape drive, or whether to replace a tape media.

20 Claims, 15 Drawing Sheets

(51) Int. Cl.
*G11B 20/02* (2006.01)
*G06F 11/22* (2006.01)
*G11B 27/00* (2006.01)
*G11B 27/36* (2006.01)
*G06F 17/30* (2006.01)
*G11B 15/66* (2006.01)
*G11B 20/18* (2006.01)
*G06F 11/14* (2006.01)

(52) U.S. Cl.
CPC ......... *G06F17/30303* (2013.01); *G11B 15/66* (2013.01); *G11B 20/02* (2013.01); *G11B 20/1816* (2013.01); *G11B 27/002* (2013.01); *G11B 27/36* (2013.01); *G06F 11/1446* (2013.01); *G11B 2220/90* (2013.01)

(56) References Cited

U.S. PATENT DOCUMENTS

| | | |
|---|---|---|
| 4,754,345 A | 6/1988 | Karlstetter |
| 4,899,230 A | 2/1990 | Sherritt |
| 4,932,826 A | 6/1990 | Moy et al. |
| 4,958,235 A | 9/1990 | Sims et al. |
| 5,253,126 A | 10/1993 | Richmond |
| 5,309,768 A | 5/1994 | Mathews et al. |
| 5,386,324 A | 1/1995 | Fry et al. |
| 5,668,800 A | 9/1997 | Stevenson |
| 5,781,703 A | 7/1998 | Desai et al. |
| 5,822,516 A | 10/1998 | Krech, Jr. |
| 5,875,303 A | 2/1999 | Huizer et al. |
| 5,881,221 A | 3/1999 | Hoang et al. |
| 5,883,864 A | 3/1999 | Saliba |
| 6,052,264 A | 4/2000 | Curtis |
| 6,052,341 A | 4/2000 | Bingham et al. |
| 6,058,092 A | 5/2000 | Masters et al. |
| 6,065,087 A | 5/2000 | Keaveny et al. |
| 6,163,853 A | 12/2000 | Findlay et al. |
| 6,195,663 B1 | 2/2001 | Cheng |
| 6,269,330 B1 | 7/2001 | Cidon et al. |
| 6,304,880 B1 | 10/2001 | Kishi |
| 6,490,253 B1 | 12/2002 | Miller et al. |
| 6,578,083 B2 | 6/2003 | Tuck, III |
| 6,624,958 B1 | 9/2003 | Alva |
| 6,636,981 B1 | 10/2003 | Barnett et al. |
| 6,715,031 B2 | 3/2004 | Camble et al. |
| 6,725,394 B1 | 4/2004 | Bolt |
| 6,799,156 B1 | 9/2004 | Rieschl et al. |
| 6,823,401 B2 | 11/2004 | Feather, Jr. et al. |
| 6,839,824 B2 | 1/2005 | Camble et al. |
| 6,950,871 B1 | 9/2005 | Honma et al. |
| 6,971,046 B1 | 11/2005 | Johnson et al. |
| 7,076,391 B1 | 7/2006 | Pakzad et al. |
| 7,194,538 B1 | 3/2007 | Rabe et al. |
| 7,200,546 B1 | 4/2007 | Nourmohamadian et al. |
| 7,200,722 B2 | 4/2007 | Goodman |
| 7,278,067 B1 | 10/2007 | Coatney et al. |
| 7,310,745 B2 | 12/2007 | Schnapp et al. |
| 7,346,801 B2 | 3/2008 | Brunelle et al. |
| 7,386,667 B2 | 6/2008 | Estelle et al. |
| 7,443,801 B2 | 10/2008 | Neidhardt et al. |
| 7,444,469 B2 | 10/2008 | Estelle et al. |
| 7,483,810 B2 | 1/2009 | Jackson et al. |
| 7,492,720 B2 | 2/2009 | Pruthi et al. |
| 7,573,664 B2 | 8/2009 | Bentley et al. |
| 7,583,604 B2 | 9/2009 | Couturier |
| 7,596,096 B2 | 9/2009 | Crawford et al. |
| 7,627,786 B2 | 12/2009 | Bello et al. |
| 7,653,840 B1 | 1/2010 | Taylor et al. |
| 7,809,990 B2 | 10/2010 | Sasaki |
| 7,885,805 B2 | 2/2011 | Dickens et al. |
| 7,908,366 B2 | 3/2011 | Sims |
| 7,971,006 B2 | 6/2011 | Justiss et al. |
| 7,974,215 B1 | 7/2011 | Sims |
| 8,035,911 B2 | 10/2011 | Ballard et al. |
| 8,099,624 B1 | 1/2012 | Saxena et al. |
| 8,108,544 B2 | 1/2012 | Ramakrishnan et al. |
| 8,117,501 B2 | 2/2012 | Taniyama et al. |
| 8,145,572 B2 | 3/2012 | Ito |
| 8,180,824 B2 | 5/2012 | McCoy et al. |
| 8,195,986 B2 | 6/2012 | Meaney et al. |
| 8,495,432 B2 | 7/2013 | Dickens et al. |
| 8,631,127 B2 | 1/2014 | Sims |
| 8,631,281 B1 | 1/2014 | Stripling et al. |
| 8,639,807 B2 | 1/2014 | Sims |
| 8,644,185 B2 | 2/2014 | Sims |
| 8,645,328 B2 | 2/2014 | Sims |
| 8,650,241 B2 | 2/2014 | Moody, II et al. |
| 8,832,495 B2 | 9/2014 | Foster et al. |
| 8,843,787 B1 | 9/2014 | Foster et al. |
| 8,949,667 B2 | 2/2015 | Foster et al. |
| 9,015,005 B1 | 4/2015 | Stripling |
| 9,058,109 B2 | 6/2015 | Moody, II et al. |
| 9,081,730 B2 | 7/2015 | Foster et al. |
| 9,092,138 B2 | 7/2015 | Sims et al. |
| 2001/0039579 A1 | 11/2001 | Trcka et al. |
| 2001/0040748 A1 | 11/2001 | Nagai et al. |
| 2002/0006004 A1 | 1/2002 | Miyamura |
| 2002/0055999 A1 | 5/2002 | Takeda |
| 2002/0169996 A1 | 11/2002 | King et al. |
| 2003/0070053 A1 | 4/2003 | Gallo et al. |
| 2003/0097439 A1 | 5/2003 | Strayer et al. |
| 2003/0126395 A1 | 7/2003 | Camble et al. |
| 2003/0128448 A1 | 7/2003 | Gunderson et al. |
| 2003/0225865 A1 | 12/2003 | Koestler |
| 2003/0233431 A1 | 12/2003 | Reddy et al. |
| 2004/0022263 A1 | 2/2004 | Zhao et al. |
| 2004/0078697 A1 | 4/2004 | Duncan |
| 2004/0139195 A1 | 7/2004 | Feather, Jr. et al. |
| 2004/0139240 A1 | 7/2004 | DiCorpo et al. |
| 2004/0168102 A1 | 8/2004 | Tsunoda |
| 2005/0044451 A1 | 2/2005 | Fry et al. |
| 2005/0052772 A1 | 3/2005 | Barbian et al. |
| 2005/0076263 A1 | 4/2005 | Tomita |
| 2005/0086554 A1 | 4/2005 | Simes |
| 2005/0091369 A1 | 4/2005 | Jones |
| 2005/0138195 A1 | 6/2005 | Bono |
| 2005/0149829 A1 | 7/2005 | Lee |
| 2005/0174869 A1 | 8/2005 | Kottomtharayil et al. |
| 2005/0210161 A1 | 9/2005 | Guignard et al. |
| 2005/0231846 A1 | 10/2005 | Winarski et al. |
| 2005/0246376 A1 | 11/2005 | Lu et al. |
| 2005/0246509 A1 | 11/2005 | Topham et al. |
| 2005/0262231 A1 | 11/2005 | Lowe et al. |
| 2006/0085595 A1 | 4/2006 | Slater |
| 2006/0092850 A1 | 5/2006 | Neidhardt et al. |
| 2006/0126211 A1 | 6/2006 | Sasaki |
| 2006/0168499 A1 | 7/2006 | Edwards et al. |
| 2006/0170238 A1 | 8/2006 | Justiss et al. |
| 2006/0174071 A1 | 8/2006 | Justiss et al. |
| 2006/0190205 A1 | 8/2006 | Klein et al. |
| 2006/0242489 A1 | 10/2006 | Brockway et al. |
| 2007/0025008 A1 | 2/2007 | Ballard |
| 2007/0067678 A1 | 3/2007 | Hosek et al. |
| 2007/0079048 A1 | 4/2007 | Starr et al. |
| 2007/0106840 A1 | 5/2007 | Estelle |
| 2007/0186066 A1 | 8/2007 | Desai et al. |
| 2007/0226336 A1 | 9/2007 | Katagiri et al. |
| 2007/0253088 A1 | 11/2007 | Clarke et al. |
| 2007/0255920 A1 | 11/2007 | Gold |
| 2007/0294591 A1 | 12/2007 | Usynin et al. |
| 2008/0019283 A1 | 1/2008 | Emile |
| 2008/0098168 A1 | 4/2008 | Estelle |
| 2008/0109547 A1 | 5/2008 | Bao et al. |
| 2008/0115015 A1 | 5/2008 | Ikezawa et al. |
| 2008/0259809 A1 | 10/2008 | Stephan et al. |
| 2008/0282265 A1 | 11/2008 | Foster et al. |
| 2009/0044047 A1 | 2/2009 | Bates et al. |
| 2009/0059757 A1 | 3/2009 | Haustein et al. |
| 2009/0070092 A1 | 3/2009 | Dickens et al. |
| 2009/0106816 A1 | 4/2009 | Ito |
| 2009/0113129 A1 | 4/2009 | Deicke et al. |
| 2009/0177314 A1* | 7/2009 | Greco et al. ............... 700/218 |
| 2009/0198650 A1 | 8/2009 | Sims |
| 2009/0198737 A1 | 8/2009 | Sims |

(56) References Cited

U.S. PATENT DOCUMENTS

| | | | |
|---|---|---|---|
| 2009/0199045 A1 | 8/2009 | Kasubuchi et al. |
| 2010/0023604 A1 | 1/2010 | Verma et al. |
| 2010/0033863 A1 | 2/2010 | Fry et al. |
| 2010/0125740 A1 | 5/2010 | Grechanik |
| 2010/0174878 A1 | 7/2010 | Davis et al. |
| 2010/0182887 A1 | 7/2010 | Moody et al. |
| 2010/0228805 A1 | 9/2010 | McCoy et al. |
| 2010/0250698 A1 | 9/2010 | Haustein et al. |
| 2010/0275219 A1 | 10/2010 | Carlson et al. |
| 2011/0194451 A1 | 8/2011 | Sims |
| 2012/0185589 A1 | 7/2012 | Sims |
| 2012/0221597 A1 | 8/2012 | Sims |
| 2013/0067587 A1 | 3/2013 | Leet et al. |
| 2014/0095815 A1 | 4/2014 | Sims |
| 2014/0112118 A1 | 4/2014 | Moody, II et al. |
| 2014/0112185 A1 | 4/2014 | Sims |
| 2014/0122438 A1 | 5/2014 | Sims |
| 2014/0325284 A1 | 10/2014 | Foster et al. |
| 2014/0359369 A1 | 12/2014 | Foster et al. |
| 2015/0106654 A1 | 4/2015 | Foster et al. |
| 2015/0178006 A1 | 6/2015 | Stripling et al. |
| 2015/0243323 A1 | 8/2015 | Moody, II et al. |
| 2015/0278007 A1 | 10/2015 | Foster et al. |

OTHER PUBLICATIONS

Penokie, George (ed.) Information Technology—SCSI Block Commands—3 (SBC-3), T10/1799-D, Working Draft, Rev. 6, Jul. 24, 2006, IBM Corp., Rochester, MN, 169 pgs.
Weber, Ralph O. (ed.) Information Technology—SCSI Primary Commands—4 (SPC-4), Project T10/1731-D, Working Draft, rev. 10, Apr. 21, 2007, ENDL Texas, Dallas, TX, 551 pgs.
Weber, Ralph O.(ed.) Information Technology—SCSI Primary Commands—3 (SPC-3), Project T10/1416-D, Working Draft, rev. 22a, Mar. 25, 2005, ENDL Texas, Dallas, TX, 496 pgs.
Oetting, Erich (ed.) Information Technology—SCSI Media Changer Commands—2 (SMC-2), INCITS T10 Project 1383D, Working Draft, rev. 7, Nov. 18, 2003, Storage Tech Corp., Louisville, CO, 68 pgs.
International Search Report and Written Opinion for International Patent Application No. PCT/US2008/63227, mailed Aug. 29, 2008, 7 pgs.
International Search Report and Written Opinion for International Patent Application No. PCT/US2009/032402, mailed Jun. 29, 2009, 11 pgs.
International Search Report and Written Opinion for International Patent Application No. PCT/US2009/032390, mailed Jul. 3, 2009, 13 pgs.
Boehler, Paul, "Common SCSI/ATAPI Command Set for Streaming Tape" QIC 157, Revision D, Quarter-Inch Cartridge Drive Standards, Santa Barbara, CA, Dec. 13, 1995, 50 pgs.
Office Action for U.S. Appl. No. 12/025,322, mailed Dec. 30, 2009, 11 pgs.
Office Action for U.S. Appl. No. 12/025,436, mailed Mar. 30, 2010, 15 pgs.
Office Action for U.S. Appl. No. 12/024,755, mailed Jun. 23, 2010, 11 pgs.
Office Action for U.S. Appl. No. 12/025,322, mailed Jul. 8, 2010, 15 pgs.
International Preliminary Report on Patentability (Ch. I) for International Application No. PCT/US2009/032402, issued on Aug. 3, 2010, 8 pgs.
International Preliminary Report on Patentability (Ch. I) for International Application No. PCT/US2009/032390 issued on Aug. 10, 2010, 8 pgs.
Office Action for U.S. Appl. No. 12/025,436, mailed Sep. 15, 2010, 21 pgs.
"SCSI DDS Tape Expert Tool (mstm Online Help)," Hewlett Packard, updated Apr. 29, 2002 and printed on Aug. 30, 2010, 8 pgs. at http://docs.hp.com/hpux/onlinedocs/diag/stm/help/expert/scsi_ddsm.htm.
Office Action for U.S. Appl. No. 11/801,809, mailed Sep. 23, 2010, 31 pgs.
Notice of Allowance for U.S. Appl. No. 12/024,755, mailed Dec. 10, 2010, 14 pgs.
Office Action for U.S. Appl. No. 11/801,809, mailed Feb. 16, 2011, 23 pgs.
Notice of Allowance for U.S. Appl. No. 12/025,322, mailed Feb. 17, 2011, 5 pgs.
Office Action for U.S. Appl. No. 12/025,436, mailed Mar. 11, 2011, 25 pgs.
International Search Report and Written Opinion for International Patent Application No. PCT/US2011/021517, mailed Apr. 19, 2011, 12 pgs.
Office Action for U.S. Appl. No. 11/801,809, mailed Jun. 6, 2011, 16 pgs.
Office Action for U.S. Appl. No. 12/025,436, mailed Aug. 22, 2011, 32 pgs.
International Preliminary Report on Patentability (Ch. II) for International Patent Application No. PCT/US08/63227, mailed Oct. 31, 2011, Patent Cooperation Treaty, 25 pgs.
Corrected International Preliminary Report on Patentability (Ch. II) for International Patent Application No. PCT/US08/63227, mailed Feb. 2, 2012, Patent Cooperation Treaty, 22 pgs.
Office Action for U.S. Appl. No. 13/459,720, mailed Aug. 1, 2012, 16 pgs.
Office Action for U.S. Appl. No. 13/430,429, mailed Aug. 2, 2012, 15 pgs.
Office Action for U.S. Appl. No. 12/025,300, mailed Aug. 6, 2012, 30 pgs.
Office Action for U.S. Appl. No. 12/861,609, mailed Aug. 7, 2012, 10 pgs.
Office Action for U.S. Appl. No. 13/091,877, mailed Oct. 11, 2012, 14 pgs.
Office Action for U.S. Appl. No. 12/025,436, mailed Nov. 9, 2012, 34 pgs.
Office Action for U.S. Appl. No. 12/861,612, mailed Nov. 27, 2012, 12 pgs.
Office Action for U.S. Appl. No. 12/888,954, mailed Dec. 13, 2012, 14 pgs.
Office Action for U.S. Appl. No. 12/861,609, mailed Jan. 4, 2013, 12 pgs.
Notice of Allowance for U.S. Appl. No. 13/430,429, mailed Feb. 11, 2013, 6 pgs.
Notice of Allowance for U.S. Appl. No. 13/459,720, mailed Feb. 11, 2013, 6 pgs.
Office Action for U.S. Appl. No. 12/025,300, mailed Feb. 15, 2013, 35 pgs.
Office Action for U.S. Appl. No. 12/692,403, mailed Feb. 20, 2013, 35 pgs.
IBM et al., Hardware and Volume Statistical Analysis and Reporting System for Detecting and Isolating Media and Hardware Errors on the Magstar Family of Tape Drives, Dec. 1, 1999, 4 pgs (IP.com No. IPCOM000013086D).
International Preliminary Report on Patentability (Ch. I) for International Patent Application No. PCT/US2011/021517, mailed Aug. 2, 2012, 8 pgs.
Notice of Allowance for U.S. Appl. No. 13/091,877, mailed Feb. 27, 2013, 10 pgs.
Notice of Allowance for U.S. Appl. No. 12/025,436, mailed Mar. 8, 2013, 10 pgs.
Office Action for U.S. Appl. No. 11/801,809, mailed Mar. 27, 2013, 13 pgs.
Notice of Allowance for U.S. Appl. No. 13/459,720, mailed May 7, 2013, 2 pgs.
Notice of Allowance for U.S. Appl. No. 13/430,429, mailed May 14, 2013, 4 pgs.
Notice of Allowance for U.S. Appl. No. 12/692,403, mailed May 14, 2013, 5 pgs.
Office Action for U.S. Appl. No. 12/861,612, mailed Jun. 11, 2013, 12 pgs.
Notice of Allowance for U.S. Appl. No. 13/091,877, mailed Jun. 11, 2013, 7 pgs.

(56) References Cited

OTHER PUBLICATIONS

Notice of Allowance for U.S. Appl. No. 11/801,809, mailed Jun. 20, 2013, 4 pgs.
Office Action for U.S. Appl. No. 12/025,300, mailed Jul. 30, 2013, 29 pgs.
Notice of Allowance for U.S. Appl. No. 13/430,429, mailed Aug. 1, 2013, 3 pgs.
Notice of Allowance for U.S. Appl. No. 13/459,720, mailed Aug. 5, 2013, 3 pgs.
Notice of Allowance for U.S. Appl. No. 12/692,403, mailed Aug. 16, 2013, 3 pgs.
Notice of Allowance for U.S. Appl. No. 11/801,809, mailed Aug. 22, 2013, 5 pgs.
Office Action for U.S. Appl. No. 12/888,954, mailed Aug. 23, 2013, 16 pgs.
Office Action for U.S. Appl. No. 12/861,609, mailed Sep. 6, 2013, 11 pgs.
Notice of Allowance for U.S. Appl. No. 12/861,612, mailed Sep. 30, 2013, 12 pgs.
Notice of Allowance for U.S. Appl. No. 12/025,436, mailed Oct. 4, 2013, 5 pgs.
Notice of Allowance for U.S. Appl. No. 13/091,877, mailed Oct. 8, 2013, 5 pgs.
Notice of Allowance for U.S. Appl. No. 13/430,429, mailed Oct. 30, 2013, 3 pgs.
Notice of Allowance for U.S. Appl. No. 13/459,720, mailed Oct. 30, 2013, 3 pgs.
Office Action for U.S. Appl. No. 11/801,809, mailed Dec. 17, 2013, 8 pgs.
Office Action for U.S. Appl. No. 12/025,300, mailed Jan. 2, 2014, 33 pgs.
Notice of Allowance for U.S. Appl. No. 12/861,609, mailed Feb. 5, 2014, 3 pgs.
Office Action for U.S. Appl. No. 12/025,300, mailed Apr. 23, 2014, 29 pgs.
Office Action for U.S. Appl. No. 14/143,046, mailed May 7, 2014, 18 pgs.
Office Action for U.S. Appl. No. 14/099,591, mailed Jun. 2, 2014, 13 pgs.
Notice of Allowance for U.S. Appl. No. 12/025,300, mailed Sep. 24, 2014, 10 pgs.
Office Action for U.S. Appl. No. 14/099,591, mailed Oct. 1, 2014, 5 pgs.
Corrected Notice of Allowability for U.S. Appl. No. 14/324,980, mailed Oct. 24, 2014, 4 pgs.
Office Action for U.S. Appl. No. 14/464,034, mailed Nov. 5, 2014, 8 pgs.
Notice of Allowance for U.S. Appl. No. 12/861,609, mailed Jun. 27, 2014, 4 pgs.
Notice of Allowance for U.S. Appl. No. 11/801,809, mailed Jun. 27, 2014, 4 pgs.
Notice of Allowance for U.S. Appl. No. 14/324,980, mailed Nov. 24, 2014, 5 pgs.
Notice of Allowance for U.S. Appl. No. 14/143,046, mailed Dec. 18, 2014, 8 pgs.
Notice of Allowance for U.S. Appl. No. 14/324,980, mailed Aug. 25, 2014, 6 pgs.
Notice of Allowance for U.S. Appl. No. 11/801,809, mailed Mar. 25, 2014, 4 pgs.
Notice of Allowance for U.S. Appl. No. 14/574,077, mailed Jun. 15, 2015, 5 pgs.
Notice of Allowance for U.S. Appl. No. 14/464,034, mailed Dec. 19, 2014, 2 pgs.
Office Action for U.S. Appl. No. 12/888,954, mailed Jan. 5, 2015, 15 pgs.
Notice of Allowance for U.S. Appl. No. 12/025,300, mailed Jan. 16, 2015, 7 pgs.
Notice of Allowance for U.S. Appl. No. 14/143,046, mailed Feb. 12, 2015, 10 pgs.
Office Action for U.S. Appl. No. 14/574,077, mailed Feb. 25, 2015, 15 pgs.
Notice of Allowance for U.S. Appl. No. 14/099,591, mailed Feb. 27, 2015, 10 pgs.
Notice of Allowance for U.S. Appl. No. 14/464,034, mailed Mar. 9, 2015, 2 pgs.
Office Action for U.S. Appl. No. 12/888,954, mailed Jul. 14, 2015, 15 pgs.
Kolaks, Marc S., "Securing out-of-band device management," SANS Institute 2003, GIAC Security Essentials Certification (GSEC), Practical Version 1.4, pp. 1-19.
Notice of Allowance for U.S. Appl. No. 14/574,077, mailed Sep. 23, 2015, 5 pgs.
Notice of Allowance for U.S. Appl. No. 14/737,007, mailed Oct. 13, 2015, 9 pgs.
Office Action for U.S. Appl. No. 14/144,077, mailed Nov. 12, 2015, 15 pgs.
Notice of Allowance for U.S. Appl. No. 14/574,077, mailed Jan. 21, 2016, 4 pgs.

* cited by examiner

FIG. 4A

4/6/2010     Completed 9840 Verifications     9840 - Failure

| | | | Tape Errors | | Gigabytes Read | | |
|---|---|---|---|---|---|---|---|
| Barcode | Date | Drive S/N | Hard Errs | Soft Errs/GB | On Wire | On Tape | Ratio |

9840 - Failure

| Barcode | Date | Drive S/N | Hard Errs | Soft Errs/GB | On Wire | On Tape | Ratio |
|---|---|---|---|---|---|---|---|
| Tape10122 | 2010-3-1 | 52 | 0 | 0.000000 | 11.7 | 9.3 | 1.26:1 |
| Tape1027 | 2009-8-10 | 3 | 0 | 0.000000 | 19.6 | 18.3 | 1.07:1 |
| Tape10364 | 2010-3-1 | 52 | 0 | 0.000000 | 29.4 | 20.1 | 1.46:1 |
| Tape10443 | 2010-3-1 | 33 | 0 | 0.000000 | 21.1 | 19.9 | 1.06:1 |
| Tape10569 | 2010-3-1 | 34 | 0 | 0.000000 | 31.6 | 20.4 | 1.55:1 |
| Tape1061 | 2009-8-10 | 2 | 0 | 0.000000 | 2.4 | 1.1 | 2.11:1 |
| Tape11458 | 2010-3-3 | 88 | 0 | 0.000000 | 16.3 | 16.2 | 1.01:1 |
| Tape12520 | 2010-3-5 | 52 | 0 | 0.000000 | 24.3 | 19.7 | 1.23:1 |
| Tape12596 | 2010-3-5 | 34 | 0 | 0.000000 | 27.4 | 19.7 | 1.39:1 |
| Tape12961 | 2010-3-5 | 83 | 0 | 0.000000 | 14.2 | 12.0 | 1.19:1 |
| Tape13044 | 2010-3-5 | 88 | 0 | 0.000000 | 32.0 | 20.5 | 1.56:1 |
| Tape1310 | 2009-8-10 | 1 | 1 | 0.000000 | 21.1 | 17.4 | 1.21:1 |
| Tape13575 | 2010-3-6 | 33 | 0 | 0.000000 | 13.4 | 10.7 | 1.25:1 |
| Tape1458 | 2009-8-10 | 12 | 0 | 0.000000 | 7.6 | 4.3 | 1.77:1 |
| Tape1486 | 2009-8-10 | 2 | 0 | 0.000000 | 20.6 | 18.1 | 1.14:1 |
| Tape15381 | 2010-3-9 | 88 | 0 | 0.000000 | 15.2 | 9.9 | 1.54:1 |
| Tape1559 | 2009-8-10 | 12 | 0 | 0.000000 | 22.6 | 18.2 | 1.24:1 |
| Tape15708 | 2010-3-10 | 83 | 0 | 0.000000 | 30.0 | 20.3 | 1.48:1 |
| Tape1575 | 2009-8-10 | 2 | 1 | 0.000000 | 26.9 | 18.3 | 1.47:1 |
| Tape1640 | 2009-8-11 | 2 | 0 | 0.000000 | 21.0 | 18.4 | 1.14:1 |
| Tape16691 | 2010-3-12 | 88 | 0 | 0.000000 | 38.3 | 19.8 | 1.93:1 |
| Tape1689 | 2009-8-11 | 1 | 0 | 0.000000 | 19.6 | 18.1 | 1.08:1 |
| Tape17525 | 2010-3-13 | 34 | 0 | 0.000000 | 7.2 | 6.8 | 1.06:1 |
| Tape18191 | 2010-3-14 | 52 | 0 | 0.000000 | 27.2 | 19.7 | 1.38:1 |
| Tape1831 | 2009-8-10 | 3 | 0 | 0.000000 | 10.7 | 9.6 | 1.12:1 |
| Tape18430 | 2010-3-15 | 52 | 0 | 0.000000 | 27.9 | 20.0 | 1.39:1 |
| Tape18648 | 2010-3-15 | 33 | 0 | 0.064134 | 19.1 | 15.6 | 1.23:1 |
| Tape18928 | 2010-3-15 | 88 | 0 | 0.000000 | 31.8 | 19.9 | 1.59:1 |
| Tape1893 | 2009-8-11 | 1 | 0 | 0.000000 | 0.3 | 0.3 | 1.00:1 |
| Tape19069 | 2010-3-16 | 33 | 0 | 0.000000 | 1.9 | 1.6 | 1.13:1 |
| Tape1908 | 2009-8-10 | 3 | 0 | 0.084937 | 20.4 | 11.8 | 1.73:1 |
| Tape20139 | 2010-3-18 | 34 | 0 | 0.000000 | 2.8 | 2.4 | 1.18:1 |
| Tape2024 | 2009-8-11 | 12 | 1 | 0.000000 | 21.8 | 18.2 | 1.20:1 |
| Tape20755 | 2010-1-9 | 27 | 0 | 0.000000 | 2.6 | 1.8 | 1.44:1 |
| Tape21082 | 2010-1-23 | 28 | 1 | 0.000000 | 34.8 | 18.9 | 1.84:1 |
| Tape21115 | 2010-3-19 | 34 | 0 | 0.000000 | 4.2 | 2.7 | 1.51:1 |
| Tape21141 | 2010-3-19 | 83 | 0 | 0.000000 | 21.2 | 17.4 | 1.22:1 |
| Tape21295 | 2010-3-20 | 52 | 1 | 0.000000 | 1.6 | 1.5 | 1.04:1 |
| Tape21398 | 2010-3-20 | 88 | 0 | 0.000000 | 0.2 | 0.2 | 1.08:1 |
| Tape21577 | 2010-3-20 | 33 | 1 | 0.000000 | 24.8 | 20.2 | 1.23:1 |
| Tape2169 | 2009-8-11 | 1 | 1 | 0.000000 | 19.5 | 18.3 | 1.06:1 |
| Tape21704 | 2010-3-20 | 88 | 0 | 0.000000 | 23.6 | 16.5 | 1.43:1 |
| Tape2176 | 2009-8-10 | 12 | 1 | 0.336631 | 16.2 | 11.9 | 1.36:1 |
| Tape219 | 2009-8-11 | 1 | 0 | 0.000000 | 19.8 | 18.1 | 1.09:1 |
| Tape22332 | 2010-3-21 | 52 | 0 | 0.000000 | 23.2 | 19.3 | 1.20:1 |
| Tape2265 | 2009-8-11 | 1 | 0 | 0.000000 | 27.5 | 18.3 | 1.50:1 |
| Tape2320 | 2009-8-10 | 12 | 0 | 0.000000 | 19.4 | 17.9 | 1.08:1 |
| Tape2411 | 2009-8-10 | 12 | 1 | 0.000000 | 22.4 | 17.9 | 1.25:1 |
| Tape24330 | 2010-3-25 | 83 | 1 | 0.000000 | 23.0 | 20.3 | 1.13:1 |
| Tape2461 | 2009-8-10 | 12 | 0 | 0.000000 | 21.4 | 18.2 | 1.17:1 |
| Tape25118 | 2010-3-27 | 52 | 1 | 0.000000 | 20.9 | 20.3 | 1.03:1 |

1                                              9840 - Failure

FIG. 4B

4/6/2010          Completed 9840 Verifications          9840 - Failure

| | | | Tape Errors | | Gigabytes Read | | |
|---|---|---|---|---|---|---|---|
| Barcode | Date | Drive S/N | Hard Errs | Soft Errs/GB | On Wire | On Tape | Ratio |
| Tape2522 | 2009-8-10 | 12 | 0 | 0.000000 | 27.9 | 17.0 | 1.64:1 |
| Tape2572 | 2009-8-11 | 1 | 0 | 0.055524 | 22.4 | 18.0 | 1.24:1 |
| Tape2577 | 2009-8-10 | 3 | 0 | 0.000000 | 20.5 | 18.2 | 1.12:1 |
| Tape2584 | 2009-8-10 | 2 | 1 | 0.000000 | 3.7 | 2.2 | 1.71:1 |
| Tape2594 | 2009-8-10 | 12 | 0 | 0.000000 | 1.4 | 0.9 | 1.61:1 |
| Tape2596 | 2009-8-11 | 1 | 0 | 0.000000 | 19.9 | 18.1 | 1.10:1 |
| Tape2608 | 2009-8-11 | 3 | 1 | 0.000000 | 22.1 | 18.1 | 1.22:1 |
| Tape26566 | 2010-3-29 | 83 | 1 | 0.000000 | 31.0 | 20.1 | 1.54:1 |
| Tape2691 | 2009-8-11 | 3 | 1 | 0.000000 | 1.0 | 0.5 | 1.87:1 |
| Tape2722 | 2009-8-11 | 2 | 0 | 122.206815 | 6.4 | 2.2 | 2.96:1 |
| Tape2739 | 2009-8-10 | 1 | 1 | 0.000000 | 18.0 | 16.3 | 1.10:1 |
| Tape27560 | 2010-3-30 | 83 | 0 | 0.000000 | 34.0 | 19.9 | 1.71:1 |
| Tape27928 | 2010-3-31 | 52 | 0 | 0.000000 | 28.3 | 20.2 | 1.40:1 |
| Tape28005 | 2010-4-1 | 34 | 0 | 0.000000 | 25.1 | 19.4 | 1.29:1 |
| Tape28093 | 2010-4-1 | 52 | 1 | 0.502081 | 22.6 | 17.9 | 1.26:1 |
| Tape2854 | 2009-8-11 | 2 | 0 | 0.000000 | 0.0 | 0.0 | 0.00:1 |
| Tape2879 | 2009-8-11 | 2 | 0 | 0.000000 | 0.0 | 0.0 | 0.00:1 |
| Tape29571 | 2010-4-3 | 83 | 0 | 0.000000 | 12.7 | 8.2 | 1.55:1 |
| Tape30013 | 2010-4-4 | 34 | 0 | 0.000000 | 24.1 | 20.0 | 1.20:1 |
| Tape3006 | 2009-8-10 | 1 | 0 | 0.000000 | 21.9 | 18.2 | 1.20:1 |
| Tape30116 | 2010-4-4 | 88 | 1 | 0.404957 | 17.6 | 7.4 | 2.37:1 |
| Tape3033 | 2009-8-10 | 1 | 0 | 0.000000 | 0.7 | 0.5 | 1.50:1 |
| Tape30355 | 2010-2-9 | 28 | 0 | 0.000000 | 0.0 | 0.0 | 0.00:1 |
| Tape30929 | 2010-1-9 | 28 | 1 | 0.000000 | 28.6 | 20.1 | 1.42:1 |
| Tape3270 | 2009-8-10 | 1 | 0 | 0.000000 | 23.5 | 18.3 | 1.29:1 |
| Tape3288 | 2009-8-11 | 12 | 0 | 0.000000 | 19.6 | 18.1 | 1.09:1 |
| Tape3307 | 2009-8-11 | 2 | 1 | 0.000000 | 24.1 | 18.3 | 1.32:1 |
| Tape345 | 2009-8-11 | 12 | 0 | 0.000000 | 0.0 | 0.0 | 0.00:1 |
| Tape3560 | 2009-8-11 | 12 | 1 | 3.221873 | 0.7 | 0.3 | 2.33:1 |
| Tape3607 | 2009-8-10 | 1 | 1 | 0.054674 | 19.5 | 18.3 | 1.07:1 |
| Tape3720 | 2009-8-10 | 2 | 0 | 0.000000 | 21.2 | 18.4 | 1.15:1 |
| Tape3738 | 2009-8-10 | 3 | 0 | 0.150838 | 22.2 | 13.3 | 1.67:1 |
| Tape3819 | 2009-8-10 | 12 | 1 | 0.000000 | 22.3 | 18.5 | 1.21:1 |
| Tape3858 | 2009-8-11 | 2 | 1 | 0.000000 | 22.2 | 18.3 | 1.21:1 |
| Tape3889 | 2009-8-10 | 3 | 0 | 0.000000 | 20.9 | 18.1 | 1.16:1 |
| Tape3891 | 2009-8-10 | 3 | 0 | 0.000000 | 9.2 | 8.0 | 1.15:1 |
| Tape401 | 2009-8-11 | 1 | 0 | 0.000000 | 31.2 | 18.4 | 1.70:1 |
| Tape4028 | 2009-8-11 | 12 | 1 | 0.000000 | 20.8 | 18.4 | 1.13:1 |
| Tape4043 | 2009-8-10 | 2 | 0 | 0.000000 | 29.9 | 17.8 | 1.68:1 |
| Tape4069 | 2010-2-9 | 27 | 0 | 0.000000 | 0.0 | 0.0 | 0.00:1 |
| Tape4117 | 2010-1-8 | 29 | 0 | 0.000000 | 34.4 | 18.3 | 1.88:1 |
| Tape4226 | 2010-1-8 | 27 | 1 | 0.000000 | 29.2 | 19.9 | 1.47:1 |
| Tape4376 | 2010-1-8 | 28 | 1 | 0.000000 | 24.1 | 19.9 | 1.21:1 |
| Tape4380 | 2010-1-8 | 27 | 0 | 0.000000 | 24.7 | 20.1 | 1.23:1 |
| Tape4486 | 2010-1-8 | 28 | 0 | 0.051364 | 29.8 | 19.5 | 1.53:1 |
| Tape4571 | 2010-1-8 | 27 | 1 | 0.156071 | 21.6 | 12.8 | 1.69:1 |
| Tape468 | 2009-8-11 | 12 | 0 | 0.000000 | 0.0 | 0.0 | 0.00:1 |
| Tape4731 | 2009-12-10 | 29 | 0 | 0.000000 | 23.1 | 18.7 | 1.23:1 |
| Tape4809 | 2010-1-10 | 29 | 1 | 32.953775 | 8.0 | 5.0 | 1.59:1 |
| Tape4913 | 2010-1-8 | 27 | 0 | 0.000000 | 28.4 | 19.9 | 1.43:1 |
| Tape4982 | 2010-1-8 | 28 | 0 | 0.000000 | 22.2 | 20.0 | 1.11:1 |
| Tape4992 | 2010-1-9 | 29 | 1 | 3.633045 | 0.7 | 0.6 | 1.34:1 |

FIG. 4C

4/6/2010      Completed 9840 Verifications      9840 - Failure

| Barcode | Date | Drive S/N | Tape Errors | | Gigabytes Read | | |
|---|---|---|---|---|---|---|---|
| | | | Hard Errs | Soft Errs/GB | On Wire | On Tape | Ratio |
| Tape5181 | 2009-12-15 | 28 | 0 | 0.000000 | 25.4 | 18.1 | 1.40:1 |
| Tape5255 | 2010-1-8 | 29 | 1 | 0.000000 | 29.4 | 19.4 | 1.52:1 |
| Tape5695 | 2010-1-8 | 27 | 0 | 0.353082 | 5.6 | 2.8 | 1.97:1 |
| Tape5758 | 2010-1-8 | 28 | 0 | 0.000000 | 28.7 | 20.1 | 1.42:1 |
| Tape5904 | 2010-1-8 | 29 | 0 | 88.303177 | 1.1 | 0.6 | 1.99:1 |
| Tape5956 | 2010-1-8 | 27 | 1 | 0.000000 | 30.6 | 20.2 | 1.51:1 |
| Tape6190 | 2010-1-9 | 27 | 0 | 0.049915 | 26.2 | 20.0 | 1.31:1 |
| Tape6685 | 2010-1-8 | 28 | 1 | 165.703116 | 0.6 | 0.6 | 1.05:1 |
| Tape6734 | 2010-1-8 | 29 | 0 | 0.000000 | 9.2 | 4.9 | 1.88:1 |
| Tape697 | 2009-7-15 | 1 | 0 | 0.857467 | 9.1 | 5.8 | 1.56:1 |
| Tape7174 | 2010-1-8 | 28 | 0 | 0.501090 | 11.1 | 10.0 | 1.11:1 |
| Tape734 | 2009-8-10 | 3 | 1 | 0.055279 | 22.4 | 18.1 | 1.24:1 |
| Tape745 | 2009-8-11 | 12 | 0 | 0.000000 | 2.7 | 1.9 | 1.44:1 |
| Tape7569 | 2010-1-9 | 27 | 0 | 0.000000 | 23.4 | 17.6 | 1.32:1 |
| Tape7649 | 2010-1-9 | 29 | 1 | 0.054904 | 25.9 | 18.2 | 1.42:1 |
| Tape7655 | 2010-1-19 | 29 | 1 | 8.249446 | 5.5 | 5.2 | 1.05:1 |
| Tape7804 | 2010-1-9 | 27 | 0 | 0.153004 | 28.0 | 19.6 | 1.43:1 |
| Tape970 | 2009-8-10 | 12 | 1 | 0.000000 | 18.6 | 18.2 | 1.02:1 |

9840 - Caution

| Barcode | Date | Drive S/N | Hard Errs | Soft Errs/GB | On Wire | On Tape | Ratio |
|---|---|---|---|---|---|---|---|
| Tape11827 | 2010-3-3 | 83 | 0 | 0.147772 | 34.2 | 20.3 | 1.68:1 |
| Tape1202 | 2009-8-10 | 2 | 0 | 0.168345 | 30.2 | 17.8 | 1.70:1 |
| Tape1264 | 2009-8-10 | 12 | 0 | 0.876324 | 26.2 | 17.1 | 1.53:1 |
| Tape13043 | 2010-3-5 | 34 | 0 | 0.147536 | 25.0 | 20.3 | 1.23:1 |
| Tape13758 | 2010-3-7 | 88 | 0 | 3.013189 | 1.1 | 0.7 | 1.61:1 |
| Tape1467 | 2009-8-11 | 1 | 0 | 0.165157 | 20.5 | 18.2 | 1.13:1 |
| Tape14979 | 2010-3-9 | 33 | 0 | 0.335801 | 3.5 | 3.0 | 1.17:1 |
| Tape1505 | 2009-8-10 | 3 | 0 | 0.172945 | 23.1 | 17.3 | 1.33:1 |
| Tape15442 | 2010-3-10 | 88 | 0 | 0.447198 | 22.6 | 20.1 | 1.12:1 |
| Tape15646 | 2010-3-10 | 52 | 0 | 0.373770 | 7.8 | 5.4 | 1.45:1 |
| Tape17532 | 2010-3-13 | 52 | 0 | 0.146419 | 24.6 | 20.5 | 1.20:1 |
| Tape17691 | 2010-3-13 | 83 | 0 | 1.006729 | 28.0 | 19.9 | 1.41:1 |
| Tape1803 | 2009-8-11 | 3 | 0 | 0.387650 | 19.5 | 18.1 | 1.08:1 |
| Tape1929 | 2009-8-11 | 3 | 0 | 0.219779 | 24.0 | 18.2 | 1.32:1 |
| Tape2106 | 2009-8-11 | 1 | 0 | 0.222834 | 22.1 | 18.0 | 1.23:1 |
| Tape2376 | 2009-8-10 | 1 | 0 | 0.205400 | 5.1 | 4.9 | 1.05:1 |
| Tape24426 | 2010-3-25 | 83 | 0 | 2.234825 | 34.9 | 20.1 | 1.73:1 |
| Tape24644 | 2010-3-26 | 33 | 0 | 0.793406 | 25.5 | 20.2 | 1.26:1 |
| Tape2506 | 2009-8-11 | 1 | 0 | 1.944290 | 4.0 | 2.1 | 1.95:1 |
| Tape25265 | 2010-3-27 | 52 | 0 | 0.155077 | 25.2 | 19.3 | 1.30:1 |
| Tape26220 | 2010-3-28 | 88 | 0 | 0.348238 | 30.9 | 20.1 | 1.54:1 |
| Tape26498 | 2010-3-29 | 52 | 0 | 0.147681 | 33.1 | 20.3 | 1.63:1 |
| Tape27450 | 2010-3-30 | 88 | 0 | 0.551576 | 24.3 | 19.9 | 1.22:1 |
| Tape28605 | 2010-4-2 | 52 | 0 | 2.567430 | 20.3 | 19.9 | 1.02:1 |
| Tape2891 | 2009-8-11 | 1 | 0 | 0.561018 | 25.2 | 17.8 | 1.41:1 |
| Tape2925 | 2009-8-10 | 2 | 0 | 0.345722 | 30.7 | 17.4 | 1.77:1 |
| Tape2965 | 2009-8-10 | 3 | 0 | 0.162015 | 19.3 | 18.5 | 1.04:1 |
| Tape30240 | 2010-4-5 | 34 | 0 | 0.149377 | 24.9 | 20.1 | 1.24:1 |
| Tape3062 | 2009-8-11 | 1 | 0 | 1.668369 | 31.2 | 17.4 | 1.79:1 |
| Tape3210 | 2009-8-10 | 1 | 0 | 1.095548 | 6.3 | 3.7 | 1.72:1 |
| Tape4101 | 2010-1-8 | 27 | 0 | 0.197122 | 31.3 | 20.3 | 1.54:1 |
| Tape4353 | 2010-1-8 | 29 | 0 | 0.152751 | 23.3 | 19.6 | 1.18:1 |

3      9840 - Caution

Completed 9840 Verifications

9840 - Caution

| Barcode | Date | Drive S/N | Tape Errors | | Gigabytes Read | | |
|---|---|---|---|---|---|---|---|
| | | | Hard Errs | Soft Errs/GB | On Wire | On Tape | Ratio |
| Tape448 | 2009-8-11 | 12 | 0 | 0.272946 | 6.5 | 3.7 | 1.77:1 |
| Tape4483 | 2010-1-8 | 27 | 0 | 0.262938 | 29.5 | 19.0 | 1.55:1 |
| Tape4514 | 2010-1-8 | 28 | 0 | 0.148717 | 30.8 | 20.2 | 1.53:1 |
| Tape4623 | 2010-1-8 | 28 | 0 | 0.406467 | 27.1 | 19.7 | 1.38:1 |
| Tape4872 | 2009-12-12 | 27 | 0 | 5.487927 | 23.8 | 20.4 | 1.17:1 |
| Tape5071 | 2010-1-8 | 27 | 0 | 0.297450 | 26.9 | 20.2 | 1.34:1 |
| Tape530 | 2009-8-11 | 12 | 0 | 1.799694 | 16.5 | 6.1 | 2.71:1 |
| Tape5511 | 2009-12-19 | 29 | 0 | 0.147696 | 25.2 | 20.3 | 1.24:1 |
| Tape552 | 2009-8-10 | 12 | 0 | 0.168246 | 24.4 | 17.8 | 1.37:1 |
| Tape5628 | 2009-12-21 | 27 | 0 | 2.337437 | 0.6 | 0.4 | 1.46:1 |
| Tape578 | 2009-8-11 | 2 | 0 | 0.164191 | 21.2 | 18.3 | 1.16:1 |
| Tape6092 | 2010-1-8 | 27 | 0 | 0.248301 | 24.3 | 20.1 | 1.21:1 |
| Tape6240 | 2010-1-9 | 29 | 0 | 0.345052 | 29.9 | 20.3 | 1.47:1 |
| Tape6775 | 2010-1-9 | 29 | 0 | 1.086752 | 22.3 | 20.2 | 1.10:1 |
| Tape7450 | 2010-1-9 | 28 | 0 | 0.150051 | 25.3 | 20.0 | 1.26:1 |
| Tape7454 | 2010-1-9 | 29 | 0 | 0.358120 | 5.1 | 2.8 | 1.81:1 |
| Tape7586 | 2010-1-9 | 28 | 0 | 0.346341 | 26.7 | 20.2 | 1.32:1 |
| Tape7780 | 2010-1-9 | 28 | 0 | 0.148571 | 24.7 | 20.2 | 1.22:1 |
| Tape8036 | 2010-1-9 | 28 | 0 | 0.198238 | 29.6 | 20.2 | 1.47:1 |
| Tape8790 | 2010-2-26 | 88 | 0 | 0.149284 | 22.6 | 20.1 | 1.13:1 |
| Tape8873 | 2010-2-26 | 52 | 0 | 0.195585 | 30.1 | 20.5 | 1.47:1 |
| Tape9235 | 2010-2-27 | 34 | 0 | 0.154067 | 32.4 | 19.5 | 1.66:1 |

9840 - Concern

| Barcode | Date | Drive S/N | Hard Errs | Soft Errs/GB | On Wire | On Tape | Ratio |
|---|---|---|---|---|---|---|---|
| Tape11954 | 2010-3-4 | 33 | 0 | 0.101617 | 23.5 | 19.7 | 1.20:1 |
| Tape12239 | 2010-3-4 | 34 | 0 | 0.100160 | 22.5 | 20.0 | 1.13:1 |
| Tape13508 | 2010-3-6 | 52 | 0 | 0.097984 | 34.4 | 20.4 | 1.69:1 |
| Tape13579 | 2010-3-6 | 88 | 0 | 0.104153 | 46.2 | 19.2 | 2.41:1 |
| Tape15799 | 2010-3-10 | 88 | 0 | 0.097309 | 23.8 | 20.6 | 1.16:1 |
| Tape17280 | 2010-3-13 | 88 | 0 | 0.084344 | 14.8 | 11.9 | 1.25:1 |
| Tape1784 | 2009-8-11 | 2 | 0 | 0.113519 | 22.7 | 17.6 | 1.29:1 |
| Tape18281 | 2010-3-14 | 83 | 0 | 0.099772 | 24.7 | 20.0 | 1.23:1 |
| Tape20165 | 2010-3-18 | 33 | 0 | 0.098474 | 33.4 | 20.3 | 1.64:1 |
| Tape20210 | 2010-3-18 | 88 | 0 | 0.066625 | 17.2 | 15.0 | 1.15:1 |
| Tape2108 | 2009-8-11 | 3 | 0 | 0.110654 | 19.3 | 18.1 | 1.07:1 |
| Tape22133 | 2010-3-21 | 52 | 0 | 0.099150 | 34.5 | 20.2 | 1.71:1 |
| Tape24095 | 2010-3-25 | 34 | 0 | 0.099006 | 24.5 | 20.2 | 1.21:1 |
| Tape24470 | 2010-3-25 | 88 | 0 | 0.098490 | 31.9 | 20.3 | 1.57:1 |
| Tape24994 | 2010-2-5 | 27 | 0 | 0.099037 | 22.6 | 20.2 | 1.12:1 |
| Tape25213 | 2010-3-27 | 34 | 0 | 0.098373 | 20.4 | 20.3 | 1.00:1 |
| Tape26951 | 2010-3-29 | 88 | 0 | 0.097533 | 22.7 | 20.5 | 1.11:1 |
| Tape27682 | 2010-3-31 | 34 | 0 | 0.098135 | 26.3 | 20.4 | 1.29:1 |
| Tape27843 | 2010-3-31 | 88 | 0 | 0.098110 | 22.0 | 20.4 | 1.08:1 |
| Tape29580 | 2010-4-3 | 34 | 0 | 0.098729 | 22.0 | 20.3 | 1.09:1 |
| Tape29736 | 2010-4-4 | 52 | 0 | 0.103357 | 36.6 | 19.4 | 1.89:1 |
| Tape3004 | 2009-8-10 | 3 | 0 | 0.108724 | 22.9 | 18.4 | 1.24:1 |
| Tape3796 | 2009-8-11 | 3 | 0 | 0.113196 | 27.9 | 17.7 | 1.58:1 |
| Tape4139 | 2010-1-8 | 29 | 0 | 0.109229 | 40.1 | 18.3 | 2.19:1 |
| Tape417 | 2009-8-11 | 3 | 0 | 0.109448 | 24.3 | 18.3 | 1.33:1 |
| Tape4328 | 2010-1-8 | 28 | 0 | 0.098100 | 36.6 | 20.4 | 1.80:1 |
| Tape4454 | 2010-1-8 | 28 | 0 | 0.103705 | 31.4 | 19.3 | 1.63:1 |
| Tape4740 | 2010-2-25 | 34 | 0 | 0.098857 | 31.6 | 20.2 | 1.56:1 |
| Tape4868 | 2010-1-8 | 29 | 0 | 0.100366 | 24.5 | 19.9 | 1.23:1 |

9840 - Concern

FIG. 4E

4/6/2010 — Completed 9840 Verifications — 9840 - Concern

| Barcode | Date | Drive S/N | Tape Errors | | Gigabytes Read | | |
|---|---|---|---|---|---|---|---|
| | | | Hard Errs | Soft Errs/GB | On Wire | On Tape | Ratio |
| Tape4870 | 2010-1-8 | 28 | 0 | 0.101568 | 30.5 | 19.7 | 1.55:1 |
| Tape5166 | 2010-1-8 | 29 | 0 | 0.098302 | 22.2 | 20.3 | 1.09:1 |
| Tape5770 | 2010-1-8 | 27 | 0 | 0.098302 | 26.1 | 20.3 | 1.29:1 |
| Tape5984 | 2010-1-10 | 29 | 0 | 0.099243 | 27.5 | 20.2 | 1.36:1 |
| Tape6310 | 2010-1-9 | 28 | 0 | 0.098847 | 32.3 | 20.2 | 1.60:1 |
| Tape7109 | 2010-1-8 | 29 | 0 | 0.099109 | 28.0 | 20.2 | 1.39:1 |
| Tape7215 | 2010-1-10 | 28 | 0 | 0.099011 | 21.3 | 20.2 | 1.05:1 |
| Tape7525 | 2010-1-9 | 28 | 0 | 0.098893 | 21.8 | 20.2 | 1.08:1 |
| Tape7600 | 2010-1-3 | 28 | 0 | 0.099351 | 21.8 | 20.1 | 1.09:1 |
| Tape7750 | 2010-1-9 | 27 | 0 | 0.099694 | 24.6 | 20.1 | 1.22:1 |
| Tape7763 | 2010-1-9 | 27 | 0 | 0.100008 | 22.5 | 20.0 | 1.13:1 |
| Tape7911 | 2010-1-10 | 27 | 0 | 0.099233 | 28.1 | 20.2 | 1.40:1 |
| Tape7971 | 2010-1-9 | 28 | 0 | 0.099632 | 23.0 | 20.1 | 1.15:1 |
| Tape8013 | 2010-1-9 | 27 | 0 | 0.068198 | 19.5 | 14.7 | 1.33:1 |
| Tape8721 | 2010-2-26 | 34 | 0 | 0.085693 | 14.6 | 11.7 | 1.25:1 |
| Tape891 | 2009-8-11 | 12 | 0 | 0.109160 | 20.3 | 18.3 | 1.11:1 |
| Tape98 | 2009-8-10 | 1 | 0 | 0.108372 | 19.9 | 18.5 | 1.08:1 |
| Tape9838 | 2010-2-28 | 88 | 0 | 0.098190 | 34.5 | 20.4 | 1.69:1 |
| Tape9887 | 2010-2-28 | 52 | 0 | 0.100913 | 31.6 | 19.8 | 1.59:1 |

9840 - Pass

| Barcode | Date | Drive S/N | Hard Errs | Soft Errs/GB | On Wire | On Tape | Ratio |
|---|---|---|---|---|---|---|---|
| Tape10 | 2009-6-25 | 2 | 0 | 0.000000 | 25.4 | 18.0 | 1.41:1 |
| Tape100 | 2009-7-1 | 2 | 0 | 0.000000 | 20.8 | 18.4 | 1.13:1 |
| Tape10000 | 2010-2-28 | 34 | 0 | 0.000000 | 34.6 | 20.3 | 1.70:1 |
| Tape10007 | 2010-2-28 | 52 | 0 | 0.000000 | 26.0 | 20.5 | 1.27:1 |
| Tape10008 | 2010-2-28 | 33 | 0 | 0.000000 | 26.1 | 19.5 | 1.34:1 |
| Tape10009 | 2010-2-28 | 88 | 0 | 0.000000 | 23.0 | 20.2 | 1.14:1 |
| Tape10014 | 2010-2-28 | 83 | 0 | 0.000000 | 30.2 | 20.5 | 1.48:1 |
| Tape10015 | 2010-2-28 | 34 | 0 | 0.000000 | 26.5 | 19.5 | 1.35:1 |
| Tape1002 | 2009-7-20 | 12 | 0 | 0.000000 | 22.2 | 18.2 | 1.22:1 |
| Tape10021 | 2010-2-28 | 52 | 0 | 0.000000 | 22.7 | 20.5 | 1.11:1 |
| Tape10022 | 2010-2-28 | 33 | 0 | 0.000000 | 34.4 | 20.4 | 1.69:1 |
| Tape10025 | 2010-2-28 | 88 | 0 | 0.000000 | 32.0 | 20.3 | 1.57:1 |
| Tape1003 | 2009-7-20 | 3 | 0 | 0.000000 | 24.2 | 18.4 | 1.32:1 |
| Tape10032 | 2010-2-28 | 52 | 0 | 0.000000 | 22.0 | 20.3 | 1.08:1 |
| Tape10035 | 2010-2-28 | 33 | 0 | 0.000000 | 23.2 | 20.4 | 1.13:1 |
| Tape1004 | 2009-7-20 | 2 | 0 | 0.000000 | 22.7 | 17.4 | 1.31:1 |
| Tape10046 | 2010-2-28 | 88 | 0 | 0.000000 | 27.1 | 20.4 | 1.33:1 |
| Tape1005 | 2009-7-20 | 1 | 0 | 0.000000 | 21.5 | 18.6 | 1.16:1 |
| Tape10056 | 2010-2-28 | 34 | 0 | 0.000000 | 25.0 | 20.5 | 1.22:1 |
| Tape10058 | 2010-2-28 | 83 | 0 | 0.000000 | 21.2 | 20.2 | 1.05:1 |
| Tape1007 | 2009-7-20 | 12 | 0 | 0.000000 | 28.4 | 18.1 | 1.57:1 |
| Tape10072 | 2010-2-28 | 52 | 0 | 0.000000 | 50.4 | 20.5 | 2.45:1 |
| Tape10073 | 2010-3-1 | 88 | 0 | 0.000000 | 29.5 | 20.5 | 1.44:1 |
| Tape10076 | 2010-3-1 | 34 | 0 | 0.000000 | 29.3 | 20.5 | 1.43:1 |
| Tape10079 | 2010-3-1 | 33 | 0 | 0.000000 | 23.6 | 20.5 | 1.15:1 |
| Tape1008 | 2009-7-20 | 3 | 0 | 0.000000 | 27.9 | 16.9 | 1.65:1 |
| Tape10080 | 2010-3-1 | 83 | 0 | 0.000000 | 26.2 | 20.4 | 1.28:1 |
| Tape10081 | 2010-3-1 | 88 | 0 | 0.000000 | 21.5 | 20.3 | 1.06:1 |
| Tape10083 | 2010-3-1 | 33 | 0 | 0.000000 | 29.6 | 20.4 | 1.45:1 |
| Tape10085 | 2010-3-1 | 83 | 0 | 0.000000 | 24.5 | 20.4 | 1.20:1 |
| Tape10093 | 2010-3-1 | 52 | 0 | 0.000000 | 22.7 | 20.2 | 1.12:1 |
| Tape101 | 2009-7-8 | 2 | 0 | 0.056006 | 25.3 | 17.9 | 1.42:1 |

FIG. 5A

4/6/2010          9840 Tapes With at Least One Bad Verification

| Result | Failure Type | Date | Drive S/N | Tape Errors | | Gigabytes Read | |
|---|---|---|---|---|---|---|---|
| | | | | Hard Errs | Soft Errs/GB | On Wire | On Tape |
| Tape10122 | | | | | | | |
| Failure | Unreadable | 2010-3-1 | 52 | 0 | 0.000000 | 11.7 | 9.3 |
| Tape1015 | | | | | | | |
| Caution | | 2009-7-20 | 2 | 0 | 0.770113 | 22.2 | 18.2 |
| Pass | | 2009-8-10 | 12 | 0 | 0.000000 | 22.1 | 18.0 |
| Pass | | 2009-8-11 | 3 | 0 | 0.000000 | 22.4 | 18.3 |
| Tape1027 | | | | | | | |
| Failure | Unreadable | 2009-7-20 | 1 | 1 | 0.000000 | 19.6 | 18.2 |
| Failure | Unreadable | 2009-8-10 | 3 | 0 | 0.000000 | 19.6 | 18.3 |
| Tape10364 | | | | | | | |
| Failure | Unreadable | 2010-3-1 | 52 | 0 | 0.000000 | 29.4 | 20.1 |
| Tape1043 | | | | | | | |
| Concern | | 2009-7-21 | 2 | 0 | 0.112217 | 23.0 | 17.8 |
| Pass | | 2009-8-11 | 3 | 0 | 0.055872 | 22.9 | 17.9 |
| Concern | | 2009-8-11 | 2 | 0 | 0.112296 | 23.4 | 17.8 |
| Tape10443 | | | | | | | |
| Failure | Unreadable | 2010-3-1 | 33 | 0 | 0.000000 | 21.1 | 19.9 |
| Tape10569 | | | | | | | |
| Failure | Unreadable | 2010-3-1 | 34 | 0 | 0.000000 | 31.6 | 20.4 |
| Tape1061 | | | | | | | |
| Failure | Unreadable | 2009-7-21 | 3 | 0 | 0.000000 | 2.5 | 1.2 |
| Failure | Unreadable | 2009-8-10 | 2 | 0 | 0.000000 | 2.4 | 1.1 |
| Tape11458 | | | | | | | |
| Failure | Unreadable | 2010-3-3 | 88 | 0 | 0.000000 | 16.3 | 16.2 |
| Tape1174 | | | | | | | |
| Concern | | 2009-7-22 | 3 | 0 | 0.112342 | 20.0 | 17.8 |
| Pass | | 2009-8-11 | 2 | 0 | 0.055524 | 20.2 | 18.0 |
| Pass | | 2009-8-11 | 3 | 0 | 0.000000 | 19.9 | 17.8 |
| Tape11827 | | | | | | | |
| Caution | | 2010-3-3 | 83 | 0 | 0.147772 | 34.2 | 20.3 |
| Tape11954 | | | | | | | |
| Concern | | 2010-3-4 | 33 | 0 | 0.101617 | 23.5 | 19.7 |
| Tape1202 | | | | | | | |
| Caution | | 2009-7-22 | 1 | 0 | 0.279785 | 30.2 | 17.9 |
| Caution | | 2009-8-10 | 2 | 0 | 0.168345 | 30.2 | 17.8 |
| Tape12239 | | | | | | | |
| Concern | | 2010-3-4 | 34 | 0 | 0.100160 | 22.5 | 20.0 |
| Tape12520 | | | | | | | |
| Failure | Unreadable | 2010-3-5 | 52 | 0 | 0.000000 | 24.3 | 19.7 |
| Tape12596 | | | | | | | |
| Failure | Unreadable | 2010-3-5 | 34 | 0 | 0.000000 | 27.4 | 19.7 |

9840 - Failure

FIG. 5B

4/6/2010          9840 Tapes With At Least One Bad Verification

| Result | Failure Type | Date | Drive S/N | Tape Errors Hard Errs | Tape Errors Soft Errs/GB | Gigabytes Read On Wire | Gigabytes Read On Tape |
|---|---|---|---|---|---|---|---|
| Tape1264 | | | | | | | |
| Caution | | 2009-7-23 | 1 | 0 | 0.994203 | 26.0 | 17.1 |
| Caution | | 2009-8-10 | 12 | 0 | 0.876324 | 26.2 | 17.1 |
| Tape12961 | | | | | | | |
| Failure | Unreadable | 2010-3-5 | 83 | 0 | 0.000000 | 14.2 | 12.0 |
| Tape13043 | | | | | | | |
| Caution | | 2010-3-5 | 34 | 0 | 0.147536 | 25.0 | 20.3 |
| Tape13044 | | | | | | | |
| Failure | Unreadable | 2010-3-5 | 88 | 0 | 0.000000 | 32.0 | 20.5 |
| Tape1310 | | | | | | | |
| Failure | Hard Errors | 2009-7-23 | 3 | 0 | 0.000000 | 21.7 | 17.7 |
| Failure | Hard Errors | 2009-8-10 | 1 | 1 | 0.000000 | 21.1 | 17.4 |
| Tape13508 | | | | | | | |
| Concern | | 2010-3-6 | 52 | 0 | 0.097984 | 34.4 | 20.4 |
| Tape13575 | | | | | | | |
| Failure | Unreadable | 2010-3-6 | 33 | 0 | 0.000000 | 13.4 | 10.7 |
| Tape13579 | | | | | | | |
| Concern | | 2010-3-6 | 88 | 0 | 0.104153 | 46.2 | 19.2 |
| Tape13758 | | | | | | | |
| Caution | | 2010-3-7 | 88 | 0 | 3.013189 | 1.1 | 0.7 |
| Tape1458 | | | | | | | |
| Failure | Unreadable | 2009-7-27 | 1 | 1 | 0.000000 | 8.1 | 4.6 |
| Failure | Unreadable | 2009-8-10 | 12 | 0 | 0.000000 | 7.6 | 4.3 |
| Tape1467 | | | | | | | |
| Caution | | 2009-7-27 | 3 | 0 | 0.219021 | 20.7 | 18.3 |
| Caution | | 2009-8-10 | 3 | 0 | 0.219589 | 20.7 | 18.2 |
| Caution | | 2009-8-11 | 1 | 0 | 0.165157 | 20.5 | 18.2 |
| Tape1486 | | | | | | | |
| Failure | Unreadable | 2009-7-27 | 1 | 1 | 0.000000 | 20.5 | 18.0 |
| Failure | Unreadable | 2009-8-10 | 2 | 0 | 0.000000 | 20.6 | 18.1 |
| Tape14979 | | | | | | | |
| Caution | | 2010-3-9 | 33 | 0 | 0.335801 | 3.5 | 3.0 |
| Tape1505 | | | | | | | |
| Caution | | 2009-7-27 | 12 | 0 | 0.169945 | 23.3 | 17.7 |
| Caution | | 2009-8-10 | 3 | 0 | 0.172945 | 23.1 | 17.3 |
| Tape15381 | | | | | | | |
| Failure | Unreadable | 2010-3-9 | 88 | 0 | 0.000000 | 15.2 | 9.9 |
| Tape15442 | | | | | | | |
| Caution | | 2010-3-10 | 88 | 0 | 0.447198 | 22.6 | 20.1 |
| Tape1559 | | | | | | | |
| Failure | Unreadable | 2009-7-28 | 2 | 1 | 0.000000 | 22.7 | 18.3 |

2          9840 - Failure

FIG. 5C

4/6/2010  9840 Tapes With At Least One Bad Verification

| Result | Failure Type | Date | Drive S/N | Tape Errors | | Gigabytes Read | |
|---|---|---|---|---|---|---|---|
| | | | | Hard Errs | Soft Errs/GB | On Wire | On Tape |
| Failure | Unreadable | 2009-7-28 | 3 | 0 | 0.000000 | 23.0 | 18.6 |
| Failure | Unreadable | 2009-8-10 | 12 | 0 | 0.000000 | 22.6 | 18.2 |
| Tape15646 | | | | | | | |
| Caution | | 2010-3-10 | 52 | 0 | 0.373770 | 7.8 | 5.4 |
| Tape15708 | | | | | | | |
| Failure | Unreadable | 2010-3-10 | 83 | 0 | 0.000000 | 30.0 | 20.3 |
| Tape1575 | | | | | | | |
| Failure | Unreadable | 2009-7-28 | 12 | 1 | 0.000000 | 26.8 | 18.1 |
| Failure | Unreadable | 2009-8-10 | 2 | 1 | 0.000000 | 26.9 | 18.3 |
| Tape15799 | | | | | | | |
| Concern | | 2010-3-10 | 88 | 0 | 0.097309 | 23.8 | 20.6 |
| Tape1640 | | | | | | | |
| Failure | Unreadable | 2009-7-28 | 3 | 1 | 0.000000 | 21.0 | 18.3 |
| Failure | Unreadable | 2009-8-10 | 3 | 1 | 0.000000 | 21.1 | 18.4 |
| Failure | Unreadable | 2009-8-11 | 2 | 0 | 0.000000 | 21.0 | 18.4 |
| Tape16691 | | | | | | | |
| Failure | Unreadable | 2010-3-12 | 88 | 0 | 0.000000 | 38.3 | 19.8 |
| Tape1689 | | | | | | | |
| Failure | Unreadable | 2009-7-29 | 2 | 1 | 0.000000 | 19.8 | 18.2 |
| Failure | Unreadable | 2009-8-11 | 1 | 0 | 0.000000 | 19.6 | 18.1 |
| Failure | Unreadable | 2009-8-11 | 2 | 1 | 0.000000 | 19.7 | 18.2 |
| Tape17280 | | | | | | | |
| Concern | | 2010-3-13 | 88 | 0 | 0.084344 | 14.8 | 11.9 |
| Tape17525 | | | | | | | |
| Failure | Unreadable | 2010-3-13 | 34 | 0 | 0.000000 | 7.2 | 6.8 |
| Tape17532 | | | | | | | |
| Caution | | 2010-3-13 | 52 | 0 | 0.146419 | 24.6 | 20.5 |
| Tape17691 | | | | | | | |
| Caution | | 2010-3-13 | 83 | 0 | 1.006729 | 28.0 | 19.9 |
| Tape1784 | | | | | | | |
| Concern | | 2009-7-30 | 3 | 0 | 0.112329 | 22.6 | 17.8 |
| Concern | | 2009-8-11 | 2 | 0 | 0.113519 | 22.7 | 17.6 |
| Pass | | 2009-8-11 | 2 | 0 | 0.055891 | 22.7 | 17.9 |
| Tape1803 | | | | | | | |
| Caution | | 2009-7-30 | 1 | 0 | 0.279801 | 19.4 | 17.9 |
| Caution | | 2009-8-11 | 3 | 0 | 0.387650 | 19.5 | 18.1 |
| Tape18191 | | | | | | | |
| Failure | Unreadable | 2010-3-14 | 52 | 0 | 0.000000 | 27.2 | 19.7 |
| Tape18281 | | | | | | | |
| Concern | | 2010-3-14 | 83 | 0 | 0.099772 | 24.7 | 20.0 |
| Tape1831 | | | | | | | |
| Failure | Unreadable | 2009-7-30 | 2 | 0 | 0.000000 | 10.8 | 9.6 |

3  9840 - Failure

SYSTEM AND METHOD FOR ARCHIVE VERIFICATION USING MULTIPLE ATTEMPTS

RELATED APPLICATIONS

This application is a continuation of, and claims a benefit of priority under 35 U.S.C. 120 of the filing date of U.S. patent application Ser. No. 12/861,612, entitled "System and Method for Archive Verification Using Multiple Attempts" filed on Aug. 23, 2010, by inventors Jeffrey Ricks Stripling and Robert C. Sims, which in turn claims the benefit of priority under 35 U.S.C. §119e to U.S. Provisional Patent Application No. 61/287,124, entitled "System and Method for Archive Verification According to Policies," filed Dec. 16, 2009, by inventors Michael Foster and Jeffrey Stripling, the contents of which are fully incorporated by reference herein.

TECHNICAL FIELD

This disclosure describes various methods and systems for verification of a media library. More particularly, embodiments of the disclosure include methods and systems for verifying the readability of library media and data stored on library media. Even more specifically, embodiments of the disclosure include methods and systems which may verify the readability of library media and data stored on library media by employing multiple attempts at verification for library media which cannot be verified on a first attempt.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage. In one embodiment, the plurality of media may comprise multiple magnetic tapes. Centralized data backup has the advantage of increased volume, efficiency and redundancy.

In many systems, the data to be backed up and backup commands are sent over a network from multiple machines on the network to a library. In many instances, the data to be backed up and the backup commands are routed to the library through a switch.

One example of a library commonly used in enterprise backup systems is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When specific data is required, a host device determines which cartridge slot contains the tape cartridge that holds the desired data. The host device then transmits a move-element command to the robot and the robot moves the tape cartridge to a tape drive which reads the desired data from the tape cartridge.

In a SCSI tape library, devices that are part of the library are typically addressed by target number. Thus, each drive and robot of a tape library typically has a target number. Cartridge slots, on the other hand, are addressed by element numbers that are used by the robot to locate the slots. Because the robot also places tape cartridges in the drives, each drive is also associated with an element number.

Components of a library are subject to wear and other forms of degradation. The degradation of library components can deleteriously affect the reliability of the library. For example, degrading tape cartridges may exhibit an increasing number of soft errors (also known as correctable errors) resulting from corrupted media sections, lost or incorrect data, bit flips, damaged or strained tape sections or other problems or issues. The degradation of a tape cartridge or other media can culminate in the failure of that tape cartridge or media. For example, a tape cartridge or sections of media may be completely unreadable, thus a hard error (also known as an uncorrectable error) or errors may occur.

SUMMARY

As discussed above, components of a library are subject to wear and other forms of degradation. Accordingly, certain verification processes have been developed. For example, as discussed in U.S. patent application Ser. No. 12/861,609, entitled "System and Method for Archive Verification According to Policies," filed on Aug. 23, 2010, hereby incorporated by reference in its entirety, certain verification methodologies may pull tapes (or other media) from a library into a particular drive and attempt to read the media. During each verification attempt, the device counts the number of correctable and uncorrectable errors on the media, the amount of data on the media, and records this and other information about the verification attempt. A decision as to the health of the media can then be made based on the information recorded during this attempt. Thus each verification attempt is treated as a single event, each attempt results in a pass or fail and no retrying of a media is attempted.

While valuable, this methodology has some flaws. For example, a single bad drive may cause many good tapes to be incorrectly flagged as bad tapes as an error rate on one tape for one drive might be high just because of a bad drive. In fact, a particular verification attempt may fail for some temporary reason but such an attempt might pass on a second or subsequent attempt. If multiple verifications attempt were desired then, a user would have to verify the tape by hand via inspection or correlate multiple independent attempts manually by, for example, reviewing the history of the tape or verifications attempts on that tape. What is desired then are systems and methods which allow media such as cartridge tapes to be verified using multiple verifications where the multiple verification attempts for a cartridge tape may be coordinated or correlated to better verify the media in a library.

Accordingly, systems, methods and apparatus for archive verification including the verification of media in a library, are disclosed. More specifically, a method of archive verification may include performing an initial verification on a set of media to obtain an initial result for each of the media. Based on the results of the initial verification a subsequent set of media may be selected for subsequent verification utilizing a set of rules. A subsequent verification may then be performed on each of the subsequent set of media. Based on the results of the subsequent verification it can then be determined if any of the media require still require subsequent verification using the set of rules. This iterative process may continue until no media need any subsequent verification.

In some embodiments, one or more reports may be generated based upon the results of the verifications of the set of media. These reports may be, for example, the results of the initial verification or results for the initial verification and one or more of the subsequent verifications. In certain embodiments, these reports may comprise information correlated with each of the set of media, such as the number of verifications, the date of each verification, the result of each verification, the drive in which the verification was performed, the type of error (if any) which occurred during the verification, the amount of data read or other information. These reports may be utilized to apply polices to determine if a cartridge should be replaced or for a wide variety of other uses, including analyzing tape drive health or evaluating the efficacy of certain brands of cartridges or tape drives.

Specifically, in one embodiment a monitoring appliance may be configured to perform an initial verification of a set of media, obtain an initial result for each of the set of media, determine a subsequent set of media based on the initial result associated with each of the set of media and a verification rule, perform a subsequent verification for each of the subsequent set of media, obtain a subsequent result for each of the subsequent set of media; and determine a result for the verification of the set of media based upon the initial result for each of the set of media and each of the subsequent result for each of the subsequent set of media.

The verification of a media itself may be performed a number of ways. In one embodiment, for example, verification may include loading a specified media into a drive at intervals, sending one or more commands to the drive in response to which the drive attempts to read the specified media or data on the specified media, collecting verification data associated with the specified media from the drive and determining a result indicating the readability of the specified media or data on the specified media. Embodiments of methods and systems for archive verification of media contained in a library can include a system comprising a controller and a set of computer instructions executable by the controller to implement the above-described method. In a further embodiment, computer readable media may contain computer instructions operable to implement the above-described method.

A multitude of advantages may be attained through use of embodiments described herein. For example, the readability of media in a library may be monitored such that the degradation of media in a library can be detected. Data on degraded media may be transferred to a different media and the degraded media replaced, preventing the loss of data. Additionally, certain embodiments may provide the advantages of performing multiple verifications before cartridge are classified as "bad". Cartridges cost money and use of this method avoids throwing away tapes that are actually good based on a single failed verification. Furthermore, by verifying the same tapes in different drives, this method helps to identify drives that have problems reading certain tapes and allows the user to remove those "bad" drives from their system rather than remove "bad" tapes. In some embodiments, by making the procedure automatic, the user is spared the human cost of manually scanning lists of failed verifications and then scheduling individual second change verifications. Moreover by using a set of rules to determine the final state of a tape, the system knows when to stop re-verifying a tape and eventually finishes its work.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 4A-4E are a representations of one embodiment of a report for a verification of a media library comprising a single verification for each cartridge.

FIGS. 5A-5C are a representation of one embodiment of a report for a verification of a media library comprising one or more verifications for each cartridge.

DETAILED DESCRIPTION

Figure 1:
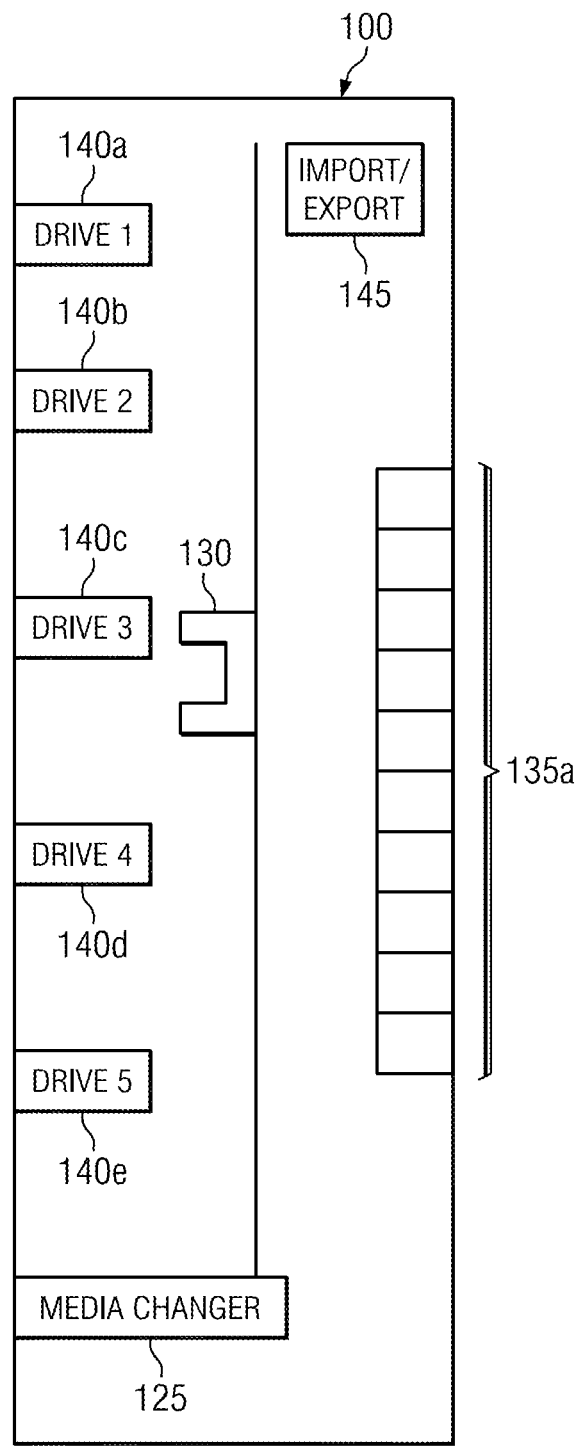
FIG. 1 is a diagrammatic representation of one embodiment of a library.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

As discussed above, components of such a library are subject to wear and other forms of degradation where the degradation of library components can deleteriously affect the reliability of the library. For example, degraded tape cartridges may exhibit an increasing number of soft errors resulting from corrupted media sections, lost or incorrect data, bit flips, damaged or strained tape sections or other problems or issues. The degradation of a tape cartridge or other media can culminate in the failure of that tape cartridge or media resulting in catastrophic consequences for the owners of that data. Accordingly, it is desired to verify media within a library such that degraded media may be replaced or removed from the library and data on degraded media to be transferred before it is damaged, corrupted or lost.

To that end, attention is now directed to the presented embodiments of systems and methods for archive verification. More specifically, embodiments of this archive verification may allow the degradation of media in a library to be monitored such that degraded media may be replaced or removed from the library and data on degraded media to be transferred before it is damaged, corrupted or lost. In particular, a method of archive verification may include performing an initial verification on a set of media to obtain an initial result for each of the media. Based on the results of the initial verification a subsequent set of media may be selected for subsequent verification utilizing a set of verification rules. A subsequent verification may then be performed on each of the subsequent set of media. In one embodiment, by applying the verification rules to the results of this subsequent verification it can then be determined if any of these subsequent set of media need still further verification. If so one or more additional subsequent verifications may be performed until none of the set of media requires subsequent verification. By verifying library media in this fashion, the degradation and reliability of library media can be monitored, allowing unreliable or unacceptably degraded media to be identified, thus allowing data on the unreliable or degraded media to be transferred or otherwise backed up and the degraded media replaced, enhancing the reliability of the library and proactively preventing data loss.

FIG. 1 is a diagrammatic representation of one embodiment of a tape library, as would be understood by one of ordinary skill in the art. Library 100 can comprise drives 140*a*-140*e*, media changer 125 and associated robot 130, import/export element(s) 145 and slots 135*a*-135*j*. Drives 140*a*-140*e* can read/write data from/to magnetic tape (contained within cartridges, however the term tape and cartridge will be used interchangeably herein to refer to a tape cartridge), eject tape cartridges and perform other operations. Slots 135*a*-135*j* store the magnetic tape cartridges when they are not in a drive and robot 130 moves the magnetic tape cartridges between drives 140*a*-140*e* and slots 135*a*-135*j*. For example, robot 130 may move a tape cartridge stored at slot 135*a* to drive 140*b* so that data can be read from the tape cartridge. It should be noted that some libraries may employ a single robot or multiple robots in an expandable or modular configuration.

Library media, such as, for example, backup media such as tape cartridges, backup hard drives or any other media, may contain a flash or other memory in which data may be recorded. This flash memory may be disparate from the memory used as storage for data sent over a network for storage at the library. One term for such flash memory is Medium Auxiliary Memory (MAM) and data stored in MAM may be referred to as MAM data. MAM data for a cartridge may regard the cartridge itself, such as the amount of data read from the cartridge, the size of the cartridge, the load count of the cartridge, etc. In general, MAM has three sections: a medium section containing data written by the manufacturer, a device section containing data written by one or more devices, such as, for example, drives, and a host section containing data written by applications such as, for example, backup applications.

The medium section may contain data from the manufacturer such as the size of the cartridge, the date of manufacture, compatibility information or other data. The device section may contain data from devices which have accessed the cartridge. For example, the device section may contain a load count counter which may be incremented by drives which have loaded the cartridge, read or write error counts, the amount of data read or written, the amount of data contained in the cartridge or other data. The host section may contain data from applications, such as, for example, backup or other applications, which have accessed the cartridge, such data may regard, for example, the type of backup data stored on the cartridge, the backup date or other data. MAM data may be accessed by a Read Attribute command: in response to a Read Attribute command, a drive or other library device may read MAM data and return MAM data to a requesting device. Examples of a Read Attribute command can be found in "SCSI Primary Commands-4 (SPC-4)", (Project T10/1731-D), Revision 2, 15 Sep. 2005, propagated by the T10 Technical Committee of the InterNational Committee on Information Technology Standards (INCITS), which is hereby incorporated by reference.

To perform archive verification certain commands which are supported by the drives may be used to verify the media. For example, a Verify command is a command which can be used to verify the readability of tape cartridges (or other library media such as laser discs, hard drives or any other media) and data stored on tape cartridges. A verifying device, which may be, for example, an appliance comprising a controller, sends a Verify command to a drive and in response, the drive determines if the cartridge can be read by attempting to read the cartridge. If the drive is able to read the cartridge, the drive returns an indication that the cartridge was successfully read (in one embodiment for example, by returning a command complete to the verifying device). If the drive is unable to read the cartridge, the drive may return an indication that the cartridge could not be read. The inability to read a cartridge or data on a cartridge may be the result of a hard error or the failure of the Verify command. Thus, a Verify command can be used to verify that a particular cartridge in a library can be read. Examples of a Verify command can be found in "SCSI Block Commands-3 (SBC-3)", (Project T10/1799-D), Revision 6, 24 Jul. 2006, propagated by the T10 Technical Committee of the InterNational Committee on Information Technology Standards (INCITS), which is hereby incorporated by reference.

It should be noted here, however, that in some cases, though manufacturers may advertise or state that certain drives are compliant with one or more specifications such as those discussed above, these drives may not actually be compliant with such standards and may thus not support the Verify command. Accordingly, a Read command may also be used to verify media. A Read command is a command which can be used to read tape cartridges (or other library media such as laser discs, hard drives or any other media). That is, a requesting device sends a Read command to a drive and in response, the drive reads data stored on the cartridge and the read data is returned to the requesting device. Thus, a Read command can be used to retrieve data from a tape cartridge in a drive. As part of this process of retrieving data, it can be verified that a particular cartridge and data on the particular cartridge can be read. For example, if a Read command is sent to a drive and data from a particular cartridge is successfully read, that particular cartridge and data on that particular cartridge can be read. On the other hand, if that particular cartridge or data from that particular cartridge cannot be read, then the cartridge may have degraded. The inability to read a cartridge or data from a cartridge may be the result of a hard error or a failure of the Read command. Thus, a verifying device can use a Read command to verify the readability of cartridges and data on cartridges. For example, a verifying device can send a Read command to a drive and if data is returned, the readability of the particular cartridge read is verified. On the other hand, if one or more hard errors are returned, or if data cannot be read from that particular cartridge, the particular cartridge may be degraded. Examples of a Read command can also be found in "SCSI Block Commands-3 (SBC-3)", (Project T10/1799-D), Revision 6, 24 Jul. 2006, propagated by the T10 Technical Committee of the InterNational Committee on Information Technology Standards (INCITS).

Other commands may be used to obtain verification data from a drive in which media is being verified. For example, a Log Sense command is a command which is used to obtain data associated with a particular drive. When a Log Sense command is sent to a particular drive of a library the particular drive returns data associated with the drive and cartridges accessed by the drive. For example, such data might include: read errors, write errors, utilization and performance data, data regarding the data written and read to a media, media loaded, detail tables or other data. Examples of a Log Sense command can be found in "SCSI Primary Commands-4 (SPC-4)", (Project T10/1731-D), Revision 10, 21 Apr. 2007, propagated by the T10 Technical Committee of the InterNational Committee on Information Technology Standards (INCITS).

Using commands of the type discussed above then, embodiments of archive verification may be performed to determine an initial result for a set of media. Based on the initial results for the set of media, a set of verification rules may be utilized to associate each of the set of media with a first set of media that do need additional verification and a second set of media it is desired to verify further. The verification rules can specify criteria for associating a media with a particular set of media or that may specify how a classification for a media is determined, including evaluating the results of a verification of a media to determine if a result may be assigned to that media (and if so what that result is) or if a subsequent verification should be performed in conjunction with the media. In addition, the verification rules may specify how such a verification is to be performed in conjunction with the media.

In certain embodiments, archive verification such as that described above may be performed by an archive verification engine. An archive verification engine can be a component of a monitoring appliance which can be a Read Verify Appliance (RVA) or the like. In one embodiment, the archive verification engine is a set of computer instructions which can be executed by a monitoring appliance controller to verify library media. It will be noted that the use of monitoring appliance for performing such archive verification is provided by way of illustration only, more appliances may be utilized, or archive verification functionality may be incorporated with other functionality such as a switch in a network or the like.

Figure 2A:
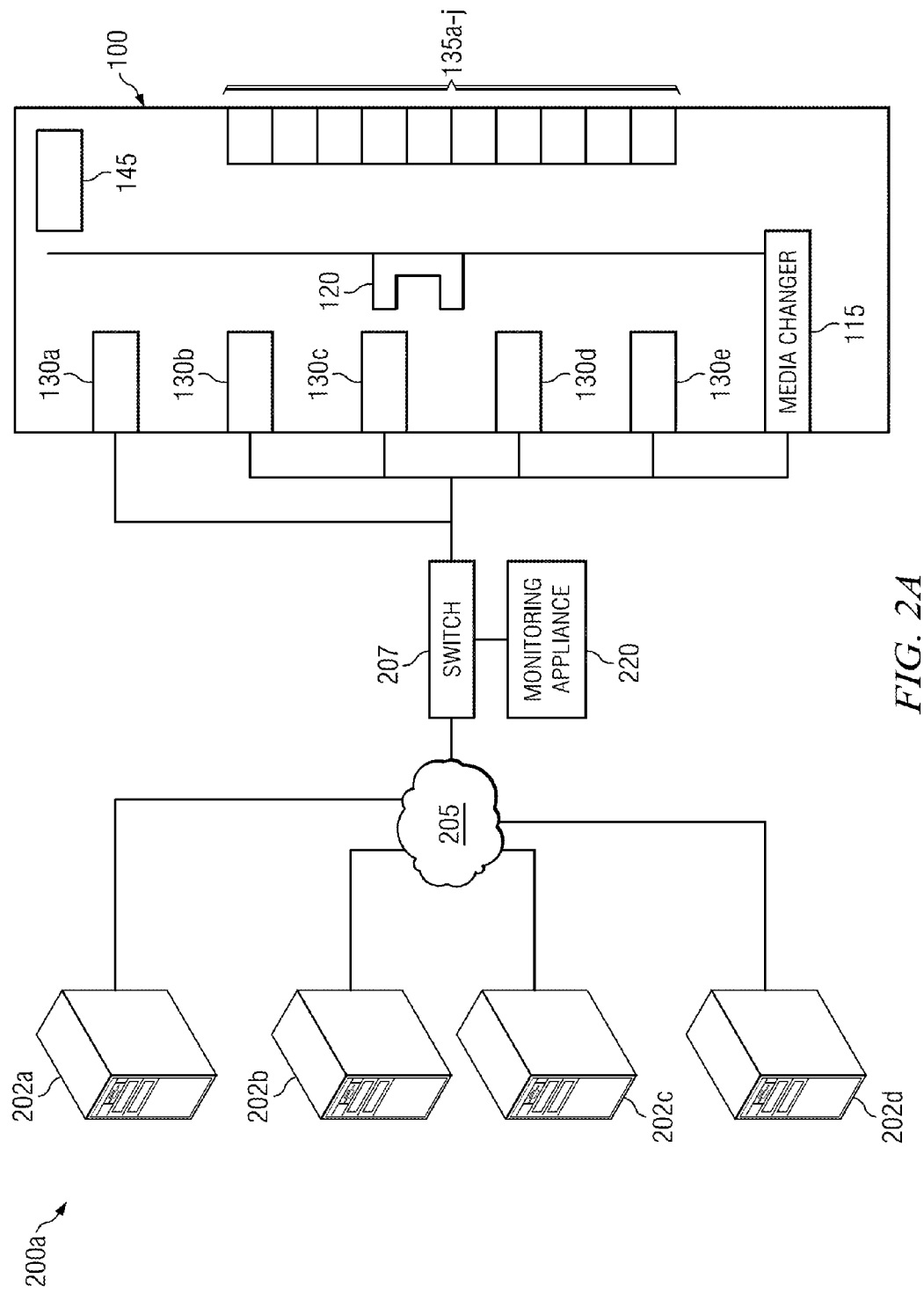
FIG. 2A-2C are diagrammatic representations of embodiments of a system utilizing a library and having a monitoring appliance.

It may be useful here, however, to illustrate various embodiments of architectures which incorporate monitoring appliance to perform archive verification. FIG. 2A is a diagrammatic representation of a system 200a in which a plurality of hosts 202a-202d have access to library 100 over network 205. Network 205 can comprise the Internet, a SAN, a LAN, a WAN, a wireless network or any other communications network known in the art. Hosts 202a-202d are coupled to library 100 via network 205 and switch 207. Similarly, library 100 can communicate with switch 207 over any suitable communications link or network known in the art and can use additional protocols such as iSCSI, TCP/IP, or other protocol known in the art. Switch 207 is connected to monitoring appliance 220.

Switch 207 is connected to library 100. Thus switch 207 can forward commands, (for example, such as Verify, Read, Log Sense, Read Attribute or other types of commands) from monitoring appliance 220 to library 100. Switch 207 receives the verification data generated in response to the commands from library 100 and forwards the verification data to monitoring appliance 220 which may utilize the verification data or may store the verification data in a repository. By utilizing the verification data to determine a result for a cartridge or by comparing verification data against previous verification data regarding a particular cartridge stored in a repository, monitoring device 220 can monitor the degradation of cartridges. Because monitoring appliance 220 verifies cartridges by sending commands to a library or library devices such as drives or other devices, monitoring appliance 220 does not need to intercept commands or responses from network 205 to verify cartridges. Thus, in one embodiment, monitoring appliance 220 can be an out-of-band appliance. This allows monitoring appliance 220 to be a non-intrusive device which does not monitor or interfere with commands from and responses to hosts 202a-202d. Consequently, monitoring appliance 220 can be a compartmentalized device which can be coupled to a switch.

Figure 2B:
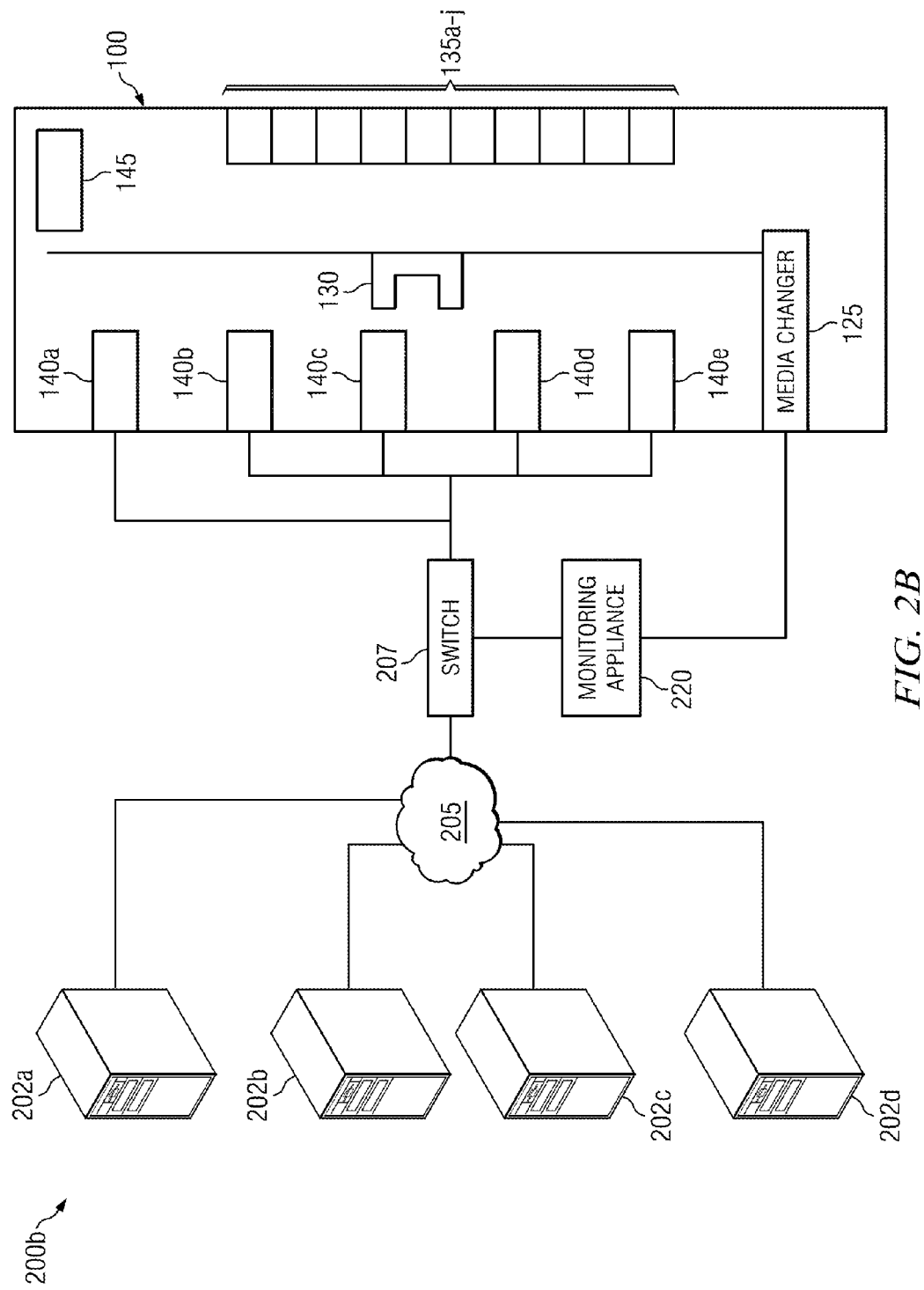
Figure 2C:
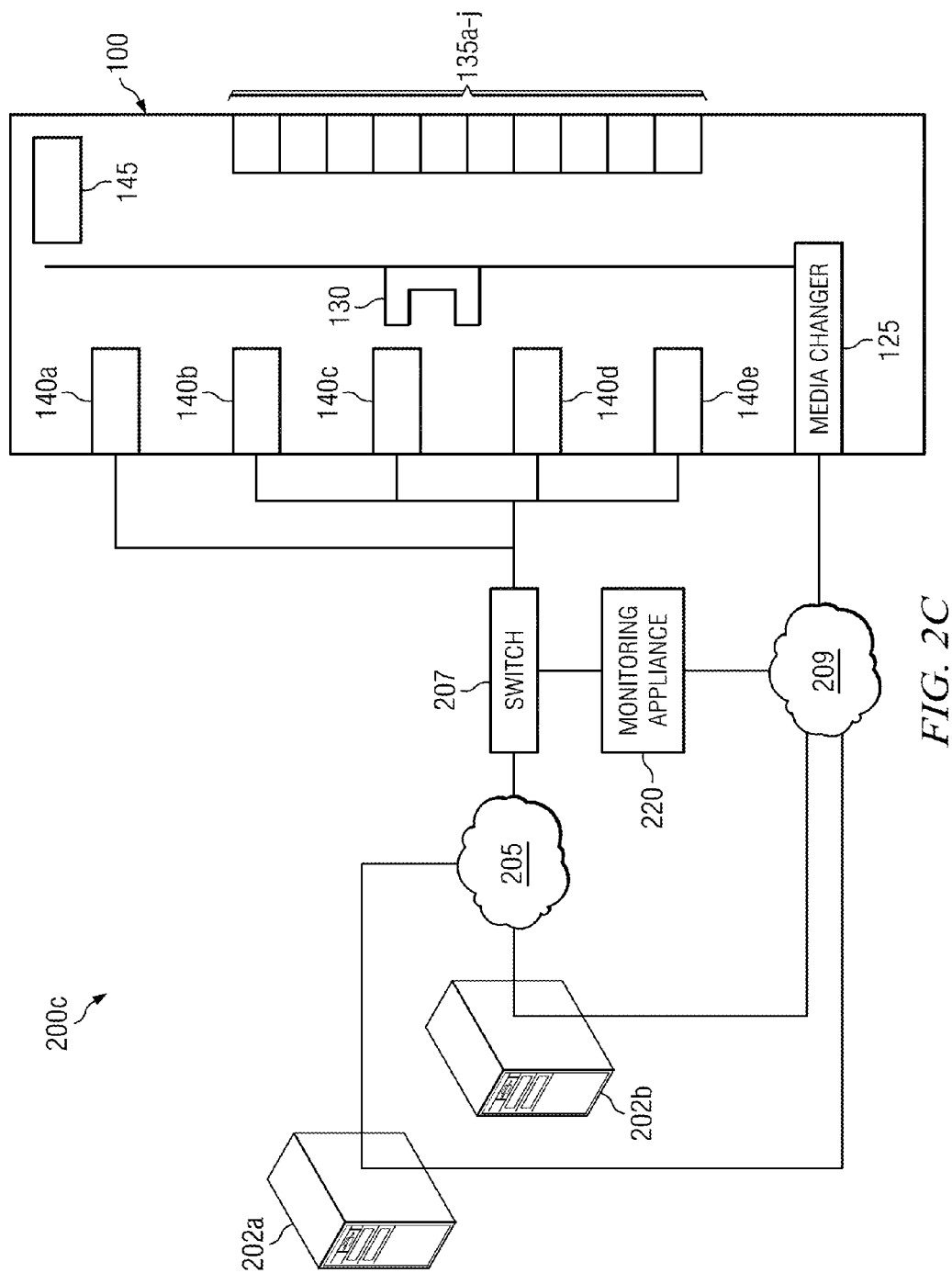

While a particular network topology is shown in FIG. 2A, a monitoring appliance may also be effectively used in other network topologies to collect data associated with a library or library components. FIGS. 2B and 2C are diagrammatic representations of other embodiments of network topologies in which a monitoring appliance can be used to collect data associated with a library or components of the library. Other arrangements will also be possible.

For example, FIG. 2B is a diagrammatic representation of a system 200b having a network topology in which monitoring appliance 220 is coupled to media changer 125 and coupled to drives 140a-140e through switch 207. Thus, monitoring appliance 220 can communicate with (in one embodiment, for example, by sending commands to or receiving data from) media changer 125 and drives 140a-140e. By way of further example, FIG. 2C is a diagrammatic representation of a system 200c having a network topology in which monitoring appliance 220 is coupled to drives 140a-140e through switch 207 and is coupled to media changer 125 through network 209. Thus, monitoring appliance 220 can communicate with media changer 125 and drives 140a-140e. In system 200c, networks 205 and 209 can be different types of networks. For example, network 205 might be a fibre channel network whereas network 209 might be an IP network.

While shown as a physical media library in FIG. 2A-2C, library 100 can be a virtual media library that is a virtual representation of one or more physical media libraries as presented by switch 207, a library controller or other component. Examples of library virtualization are described in U.S. patent application Ser. No. 10/704,265, entitled "System and Method for Controlling Access to Multiple Physical Media Libraries," and U.S. patent application Ser. No. 10/703,965, entitled "System and Method for Controlling Access to Media Libraries," both of which are hereby incorporated by reference herein.

Figure 3:
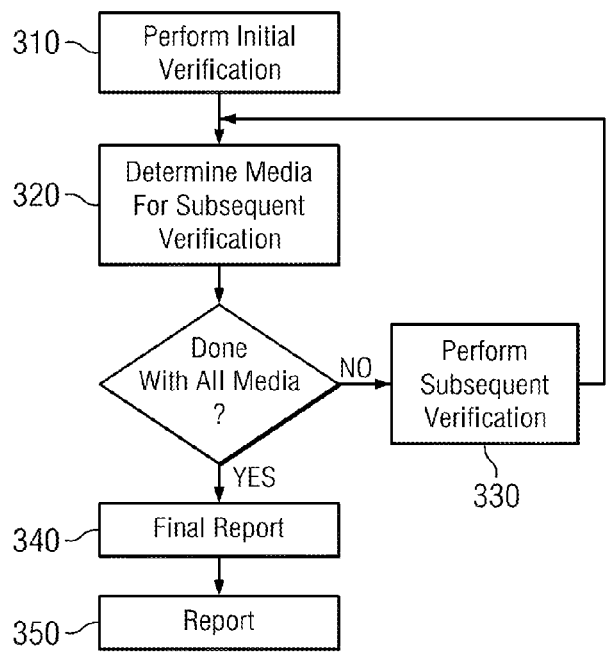
FIG. 3 is a flowchart illustrating a method for verifying a media library.

Turning now to FIG. 3, one embodiment of a method for archive verification (which may, for example, be performed by a monitoring appliance such as those in FIGS. 2A-2C) is depicted. To perform media library verification a monitoring appliance (for example, monitoring appliance 220 of FIGS. 2A-2C) may perform an initial verification for each of a set of cartridges in the library to obtain a result for each of the cartridges at step 310. The initial verification may be performed in a variety of manners such as those illustrated in U.S. patent application Ser. No. 11/801,809, entitled "Method and System for Non-Intrusive Monitoring of Library Components", U.S. patent application Ser. No. 12/024,755, entitled "Media Library Monitoring System and Method," U.S. patent application Ser. No. 12/692,403, entitled "System and Method for Identifying Failing Drives or Media in Media Library," which are all hereby incorporated by reference in their entirety and will be discussed in more detail later in this disclosure.

For example, if the drive supports the Verify command, the commands may be Verify commands while if the drive does not support the Verify command the commands may be Read commands. If the drive is able to read data stored on the cartridge and so verify the readability of the cartridge, the drive returns an indication of a successful verification. Such an indication may be, for example, a command complete message. If, however, the drive is unable to read data stored on the cartridge or the cartridge, the drive may return an indication of a failed verification. The inability to read a cartridge may be the result of a hard error or the failure of a command. Based on verification data (which may be, for example, data used to determine the reliability of media, such as data returned in response to a Verify command, Read command, Log Sense command, Read Attribute command, etc.) returned from the drive, a result for each of the tapes verified can be determined. The result may be a PASS or a FAIL and may be associated with the tape. Other results and rules will also be possible. For example, the PASS result may be further divided into results of CAUTION, CONCERN or GOOD, based upon the verification data based on an analysis of the verification data, embodiments of which will be discussed in more detail below.

In many cases, however, a single bad drive may cause many good tapes to be incorrectly flagged as bad tapes or a particular verification attempt may fail for some temporary reason. As cartridges are expensive, and replacement is usually time consuming, it may be desired to further verify certain cartridges to ensure that good cartridges are not disposed of incorrectly. Accordingly, after the initial verification completes, and results have been associated with each of the cartridges, at step 320, a set of cartridges on which it is desired to perform subsequent verification may be determined. A set of verification rules may thus be utilized to associate the set of cartridges with a first set of cartridges for which no further verification is needed and a second set of cartridges it is desired to verify further. These verification rules may group the cartridges based upon the results of one or more past verifications.

For example, in one embodiment a verification rule may include a rule that specifies that a tape that passes an initial verification shall not be verified more than once. In other words, in one embodiment a verification rule may specify that if a result of PASS (or CAUTION, CONCERN or GOOD) is associated with a cartridge after the initial verification that cartridge belongs to the first set of cartridges and does not need to be verified further. Accordingly, when such a rule is applied any tape that has a corresponding result with a value of PASS may be associated with the first set of cartridges, whereas any tape that has a corresponding result for the initial verification with any other value may be associated with the second set of cartridges. Similarly, another verification rule may include a rule that specifies that any tape that does not pass an initial verification (for example, is not in the first set of cartridges) should be associated with the second set of cartridges and will be subject to further verification. Another example of a verification rule may be that all tapes will undergo at least two verifications in at least two different drives. In this case, after the initial verification all cartridges will be associated with the second group of cartridges.

Subsequent verification can then be performed on each of the cartridges associated with the second set at step 330 to determine another result for each of the second set of cartridges. This subsequent verification may be performed in accordance with any of the verification rules that apply to the second set of cartridges. For example, a rule may specify that a cartridge is to be verified in a different drive than the drive where a previous verification occurred if the media library comprises multiple drives. In certain embodiments, verification of cartridges may occur by placing cartridges to be verified in a prioritized queue and when a cartridges reaches the head of the queue and a tape drive is available, the appliance moves the cartridges to the tape drive, attempts to read the cartridges, records results of the attempt, and then moves the cartridges out of the tape drive and removes the cartridges from the verification queue. In one embodiment then, a cartridge may be verified in a tape drive that is available, even if it is the same tape drive where a previous verification occurred. Alternatively, in some embodiments if a verification rule states that a cartridge is to be verified in a different drive than was used in a previous verification, when that cartridge reaches the head of the queue the drive(s) where the cartridge has been previously verified may be ascertained. It can then be determined if a different drive is free such that verification of the cartridge can be performed in that drive. If so verification of that cartridge may be performed using that drive, while if a different drive is not free the cartridge may be placed at the tail of the queue or held until a different drive becomes available for verification. As can be seen then, verification rules may entail the evaluation of multiple criteria.

For example, a verification rule which may operate as discussed above may specify that:

If
the system wishes to select a tape for verification
and more than one drive is allocated for verification
and a drive becomes available for verification
and the drive available for verification matches the drive used last for the tape at the head of the queue then
skip the tape at the head of the queue and consider the next tape in the queue for verification.

Once subsequent verification has occurred with respect to each of the second set of cartridges, each of the cartridges may have a second result associated with it. The verification rules may then be applied again at step 320 to determine a first set of cartridges for which no further verification is desired and a second set of cartridges for which subsequent verification is desired. For example, a verification rule may specify that any cartridge which has been verified in a minimum of two different drives may not need any further verification and such a cartridge may be assigned to the first set of cartridges. A verification rule may also specify that a cartridge shall be repeatedly verified until a result occurs more than any other result. In this case, a cartridge may be associated with the first set of cartridges if one result has occurred more than any other or associated with the second set of cartridges if no result has occurred more than any other result. Similar verification rules may specify that a cartridge shall be repeatedly verified until one type of a result is in the majority or occurs at double the rate of any other result.

It will be noted from a review of the above that almost any verification rule desired may be implemented in conjunction with embodiments as discussed herein and that the specific verification rules discussed are provided by way of example only. Additionally, it will be noted that these verification rules may be applied in conjunction with one another. Thus, for example, one verification rule may specify that a cartridge be verified in a minimum of two tape drives and another verification rule may specify that a cartridge shall be repeatedly verified until one result is observed more than any other result or a plurality of one type of result is present. Here a cartridge may be associated with the second group of cartridges until it has both been verified in multiple drives and one result is observed more than any other.

Once the first set of cartridges for which no more verification is needed and a second set of cartridges for which subsequent verification is needed are determined it can be determined if the second set of cartridges is empty, in other words if there are any more cartridges for which an additional verification is desired. If no more cartridges require subsequent verification according to the verification rules, the verification of cartridges may stop. Alternatively, if there are one or more cartridges which require subsequent verification, the subsequent verification of these cartridges at step 320 and the determination if there are any cartridges that require additional verification at step 330 may continue until there are no more cartridges which require additional verification.

Using the result(s) associated with each of the cartridges then, in one embodiment, a final result to associate with the cartridge may be determined at step 340. This analysis may entail an algorithmic analysis of the results from each verification which occurred with respect to the cartridge, the verification data corresponding to each result for the cartridge such as the number of errors which occurred or the type of errors which occurred, the drives used for each of the verifications or other data, other verification data or some combination of this or other data. For example, the final result may be the result which occurs most often in the verifications performed on a cartridge or the final result may be PASS if no FAIL result has occurred in any of the verifications performed on the cartridge. Alternatively, in other embodiments a final result may not be determined. In one embodiment, the operators, owners or users of media library may develop policies to implement based upon the results. For example, if a cartridge has three associated verification results, two PASS and one FAIL it may be desired to replace the tape when data is highly sensitive, such as in a banking environment, while in other environments such a tape may continue to be utilized without replacement.

Additionally, at step 350, in certain embodiments a report corresponding with the set of cartridges may be generated. This report may comprise a report for the initial verification of each of a set of cartridges or a report which comprises data on each verification performed on a set of cartridges. Examples of these reports are presented respectively in FIGS. 4 and 5. Notice with reference to FIG. 5 which depicts an embodiment of a report which comprises data on each verification performed on a cartridge, that such a report may comprise an identifier for a cartridge such as "Tape1015," a result for each verification performed, such as CAUTION or PASS, the date on which search a verification was performed, the drive number in which each verification was performed, data on the errors which occurred during each verification and the type of error(s) which occurred, data on the verification process such as the amount of data read and from where data was read.

This report may provide an administrator or IT professional with a basis for determining whether a tape should be replaced or whether errors which occurred in conjunction with a verification were caused by a failing tape or a malfunctioning drive. Furthermore, such a report may lend insight to other areas of functionality of a storage system. For example, by evaluating this type of report it may be possible to discern which drives are bad or are likely to go bad by determining which drives are correlated with a high number of a failing results for a verification. Other uses for such reports may be imaginable. Reports may also be generated and sorted based on other criteria. For example, a report may be generated which is sorted by tape drives, such that the errors which occur during multiple verifications or results of verifications may be more easily correlated with the drives in which these verifications occur. This may allow an administrator to determine which drives are bad or are likely to go bad.

Such reports may also be helpful in the migration or movement of data. For example, if a cartridge encounters multiple errors on multiple drives but passes with any regularity on a particular drive such a report may allow an administrator to determine that this cartridge may be read by that particular drive such that if it is desired to read data from that cartridge in the future (for example, when replacing that cartridge or migrating the data on that cartridge) the administrator will know to utilize the particular drive in which that cartridge can be read. In fact, such reports may be analyzed to determine which brands of cartridges or tape drives are more reliable or will function better in particular environments.

It may be useful here to run through a brief example in which a set of ten cartridges are to be verified. Of these ten tapes, seven pass on the first try. These tapes are not verified again, they are deemed to PASS. The remaining three tapes are verified a second time. Each tape is verified the second time in a drive other than the first drive using this algorithm:

If
    the system wishes to select a tape for verification
    and more than one drive is allocated for verification
    and a drive becomes available for verification
    and the drive available for verification matches the drive used last for
    the tape at the head of the queue
then
    skip the tape at the head of the queue and consider the next tape in
    the queue for verification.

After these three verifications, two verifications get the same result of FAIL. These two tapes now have verifications that agree and are marked as FAIL. The third tape got one result of PASS and one result of FAIL. No result is most common, so the verification is repeated again. If possible, a third drive might be used for this tiebreaker verification. On the third attempt for the third tape, the tape gets the result of "pass". Since the tape now has more "pass" results than any other status and it has now been tested in at least two drives, the tape now is marked as "good".

This process is shown in the table below for a set of ten tapes and four drives:

| Tape ID | First Pass | Second Pass | Third Pass | Result |
| --- | --- | --- | --- | --- |
| 1 | Drive 1: Pass | | | Good |
| 2 | Drive 2: Pass | | | Good |
| 3 | Drive 3: Pass | | | Good |
| 4 | Drive 4: Pass | | | Good |
| 5 | Drive 1: Pass | | | Good |
| 6 | Drive 2: Pass | | | Good |
| 7 | Drive 3: Pass | | | Good |
| 8 | Drive 4: Fail | Drive 1: Fail | | FAIL |
| 9 | Drive 1: Fail | Drive 2: Fail | | FAIL |
| 10 | Drive 2: Fail | Drive 3: Pass | Drive 4: Pass | Good |

Figure 6:
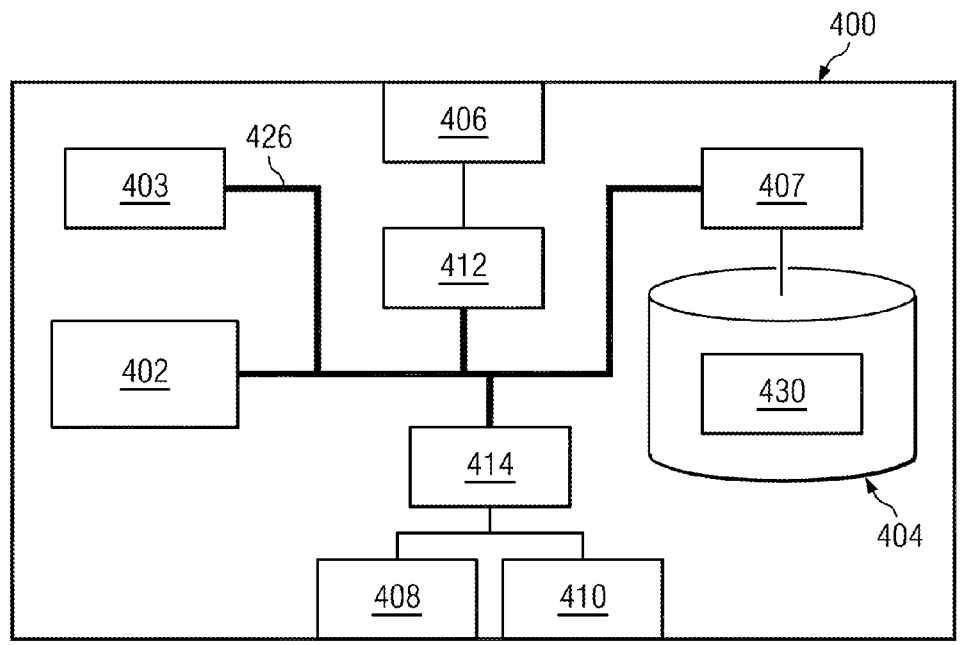
FIG. 6 is a diagrammatic representation of one embodiment of a controller which can be used in a monitoring appliance.

It may be useful here to delve into embodiments of systems and methods for which may be used to perform archive verification. As discussed above, embodiments of the systems and methods discussed herein may be usefully utilized in a monitoring appliance. Embodiments of such a monitoring appliance will now be discussed in more detail. In FIG. 6, a diagrammatic representation of one embodiment of a monitoring appliance controller 400 ("controller 400") is depicted. Controller 400 can include a processor 402, such as an Intel Pentium 4 based processor (Intel and Pentium are trademarks of Intel Corporation of Santa Clara, Calif.), a primary memory 403 (which, in one embodiment, may comprise RAM, ROM, Flash Memory, EEPROM or other computer readable medium known in the art) and a secondary memory 404 (which, in one embodiment may comprise a hard drive, disk drive, optical drive, database or other computer readable medium known in the art). A memory controller 407 can control access to secondary memory 404. Controller 400 can comprise a communications interface 406 (which, in one embodiment, may comprise a fibre channel interface, Ethernet port or other communications interface known in the art) to connect controller 400 to a switch or other network interface such as, for example, switch 207 of FIGS. 2A-2C. An I/O controller 412 can control interactions with the switch. Similarly, an I/O controller 414 can control interactions over I/O interfaces 408 and 410. Controller 400 can include a variety of input devices. Various components of controller 400 can be connected by a bus 426.

Secondary memory 404 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 404 can store a software program 430 that comprises an archive verification engine. Secondary memory 404 can also store verification policies or rules that may be used with software program 430. Secondary memory 404 can also serve as a repository for verification data which may be saved over time and store other data such as a drive list, a tape list, a verification list, a verification window, etc. During execution by processor 402, portions of program 430 can be stored in secondary memory 404 and/or primary memory 403.

Figure 7:
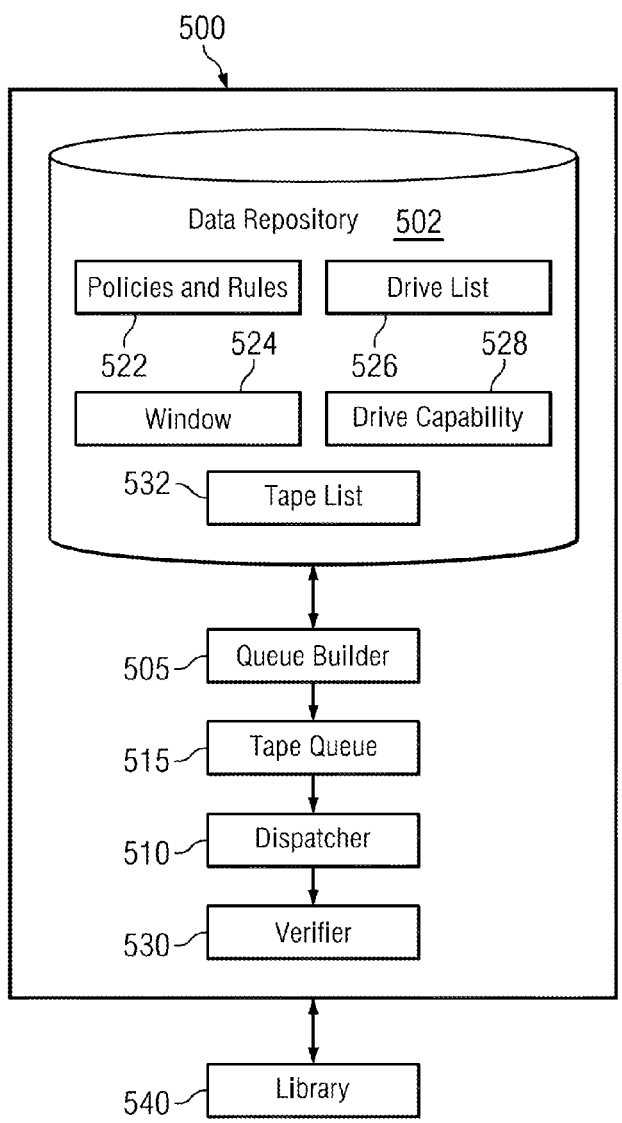
FIG. 7 is a diagrammatic representation of one embodiment of a system for performing verification.

FIG. 7 is a diagrammatic representation of one embodiment of a verification system that may, for example, be implemented in conjunction with a monitoring appliance. According to one embodiment, the system 500 can include a data repository 502, a queue builder 505, dispatcher 510 and a verifier 530. The data repository 502 may comprise data used for, or obtained through, the verification of tapes in a media library. In one embodiment, such data may comprise a prioritized list of verification policies and verification rules 522 to be utilized in a verification process, a verification window 524 specifying one or more drives of a library and associated times when each of these drives can be used for a verification process, a drive list 526 identifying the drives in the library, where each drive is associated with drive type information (for example, manufacturer, model number, serial number, address, etc.) and a state designating if the drive is available for use in a verification process but in use, available for use in a verification process and not in use, or not available for verification (this state may be determined based on, for example, the verification window 524), a drive capability list 528 which may comprise a list of drive types and each drive type's corresponding functionality (for example, if the drive type supports a Verify command), a tape list 532 that comprises a list of each tape in the library and associated information for the tape, including for example, a type of the tape or a result determined for the tape during the verification process, a last verification date specifying when the last verification was performed on the tape, verification data associated with the tape, etc. Tracking cartridges and maintaining information regarding cartridges is described in U.S. patent application Ser. No. 11/801,809, entitled "Method and System for Non-Intrusive Monitoring of Library Components," and U.S. patent application Ser. No. 12/024,755, entitled "Media Library Monitoring System and Method," both of which are hereby incorporated by reference, and verification data obtained during the verification process where the verification data may include such data as the number and type of errors.

Using data in data repository 502, queue builder 505 builds a queue of tapes 515 which are to undergo a verification process. Queue builder 505 can be executed substantially continuously (for example, a background process such as a daemon or the like), or be initiated and terminated as needed or desired. Queue builder 505 can evaluate verification rules 522 to associate tapes with a first set of tapes or a second set of tapes based on the verification rules 522. During a verification of a tape, queue builder 505 may also evaluate verification policies 522 in the order of their priority. Queue builder 505 then evaluates the tapes to determine if the tapes meet each verification policy. Queue builder 505 can utilize data in data repository associated with each tape to determine if the tape meets criteria specified in a verification rule or a verification policy. Thus, for example, if a policy pertaining to the last verification conducted on a tape is being evaluated, queue builder 505 can utilize the last verification dates of all the tapes stored in conjunction with those tapes in, for example, tape list 532.

Once the list of tapes that are in a set of tapes on which verification is desired or which meet a verification policy are identified, queue builder 505 may flag a tape, add the tape to queue 515 (which may be a table in data repository 502) or otherwise identify tapes to be verified. As a result queue builder 505 can organize the order in which tapes are to be verified. For example, a queue 515 can be sorted such that tapes satisfying the highest priority policy are at the top of the queue, tapes satisfying the next highest priority policy next in the queue and so on. Tapes satisfying multiple policies can be ordered with the highest priority policy that they satisfy.

Dispatcher 510 can be a thread tasked with controlling the scheduling of verification of tapes using particular drives and dispatching these verifications. Dispatcher 510 can be executed in a continuous loop or be initiated and terminated as needed or desired, or at regular intervals (for example, every 30 seconds, 5 minutes, etc.). Dispatcher 510 can be responsible for determining if drives are available for verification and the tapes that are to be verified in the available drive. Dispatcher 510 can provide drive identification (drive serial number, address or other identifier), or tape or volume identification (e.g., tape barcode, location of the tape or other identification) to verifier 530.

Dispatcher 510 can determine if there are any drives available using the state associated with each drive analyzing tape movements through the tracking data associated with, for example, a tape in tape list 532 or drive in drive list 526, or by sending Inquiry commands to the drives designated as verification drives to ensure that they are free. Because not all tape drives can handle all tapes, dispatcher 510 can determine which of the available verification drives are compatible with the tapes in the queue (or otherwise identified) and assign each tape to a compatible verification drive. This can be done for all the tapes or can be done as each tape comes to the top of the queue. Dispatcher 510 can also assign tapes to drives for load balancing or other reasons. If a verification drive is not available to support a particular tape, that tape can be skipped during verification and verified when an appropriate drive becomes available.

Dispatcher 510 can also determine if tapes identified for verification are available by reviewing tape tracking information to determine if a tape is in a drive or import/export slot, sending Read Element Status commands to the media library or otherwise determining the status of each tape identified for verification. According to one embodiment, an unavailable tape can remain in the verification queue until it can be verified. In some embodiments, the location of that tape in the queue could be altered (for example, the tape could be moved to the front of the queue so that it is more likely the tape will be verified when it is available).

Verifier 530 can be used to receive data from, and issue commands to, the library for the verification of a tape, storing results obtained during the verification, deriving verification data from other verification data or determining a result for the verification of a tape. For example, verifier 530 can issue commands to reserve the appropriate drive, move the tape, run the verification, rewind the tape, move the tape back to items original position or other storage slot, release the drive and update tape list 532 or otherwise store verification data or the results of the verification. Verifier 530 can also receive data from library returned, for example, in response to commands that it issued.

Figure 8:
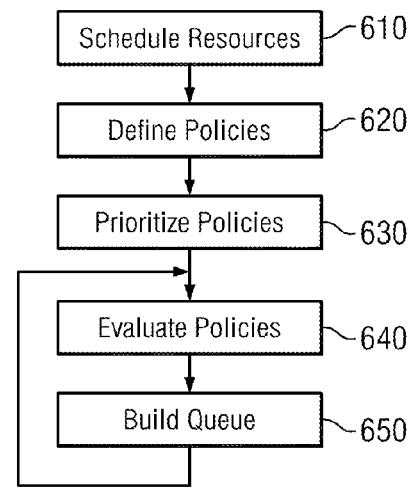
FIG. 8 is a flow diagram illustrating one embodiment of a method for use in performing verification.
Figure 9:
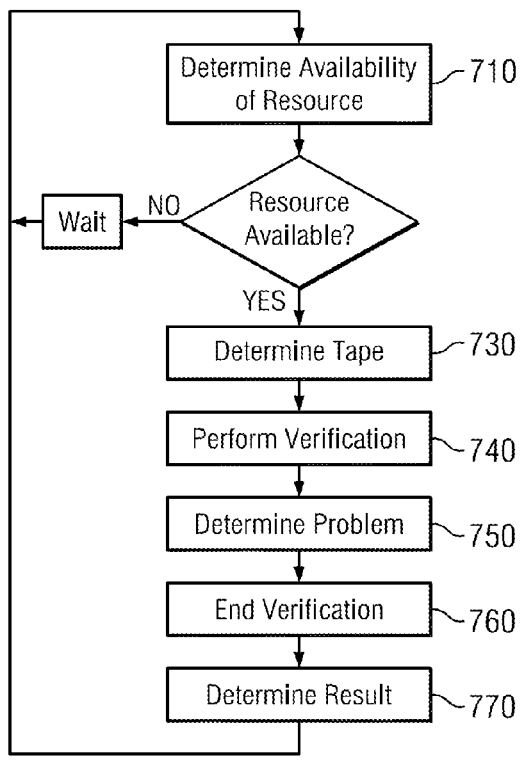
FIG. 9 is a flow diagram illustrating one embodiment of a method for use in performing verification.
Figure 10:
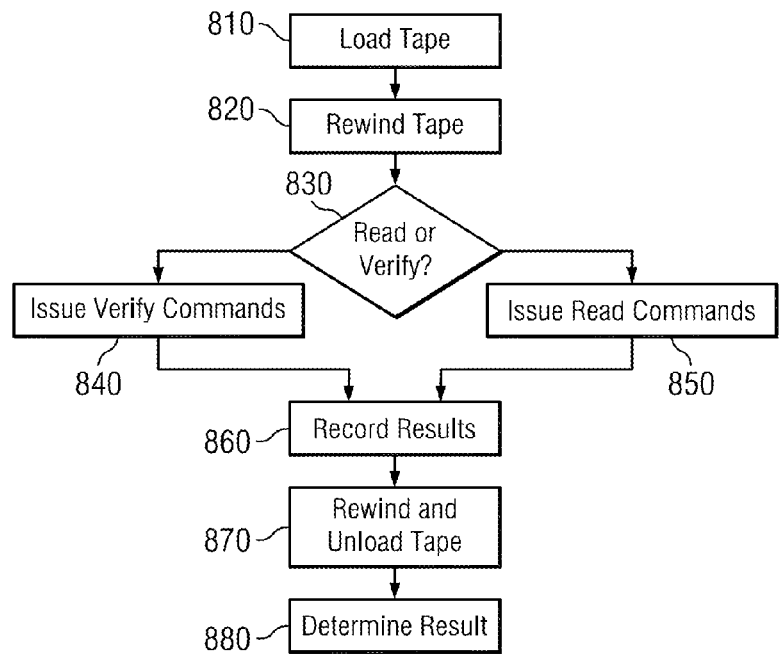
FIG. 10 is a flow diagram illustrating one embodiment of a method for use in performing verification.

Turning now to FIGS. 8-10, embodiments of methods of verification which may be employed by monitoring appliances such as those in FIG. 6 are depicted. Referring first to FIG. 8, one embodiment of a method for identifying tapes to be verified is depicted. At step 610 resources may be scheduled for use in the archive verification process. As the media library may undergo verification as described herein while in regular use (for example, while being used for backup or archiving of data, etc.) it may be desired that the archive verification be assigned a lower priority than the regular operations of the library. Accordingly, it may be desired to schedule such verification operations for off-peak or relatively low use time periods or to dedicate a set of drives for exclusive use by the verification process to allow the remaining drives to continue with the regular operation of the media library. Thus, in some embodiments an administrator may provide a verification window, which may comprise one or more resources (for example, drives) and one or more corresponding time periods for each of those drives. For example, a specific drive of a library may be dedicated to archive verification such that the drive is generally only used for archive verification and is available at all times. In other embodiments, to minimize possible conflicts between archive verification and other operations performed by a library, certain drives may be dedicated to archive verification for periods of time (for example, nightly from 12:00 a.m. to 4:00 a.m.) or a specific drive may be dedicated to archive verification for a two hours on certain days. In a further embodiment, all the drives in a library are dedicated to archive verification during a verification window of a specific time period. For example, the verification window may specify that all the drives in a library may be dedicated to archive verification during a defined time period (for example, every month).

Verification policies may then be defined for use in the archive verification process at step 620. These verification policies define one or more criteria which may be used to identify media which should be subjected to verification. These policies may be based on time periods, types of media (for example, types of tape cartridge), how many times the tape has been loaded or read, how many errors have occurred during regular use of the media, or almost any other criteria or combination of criteria desired. Examples of such verification policies have been previously discussed herein, other examples will also be possible.

These policies can then be prioritized at step 630. The prioritization of policies allows the defined polices to be assigned a priority with respect to the other defined policies such that the policies with higher priorities will be used to identify tapes before policies with lower priorities. In this manner, tapes identified by the higher priority verification policies may be verified before those tapes identified by the lower priority verification policies.

At step 640, then, the policies may be evaluated. The evaluation of these policies may take place according to a defined time period (for example, policies may be evaluated every 30 minutes), may take place at different time intervals or may occur based on some other timing. The evaluation of the policies may occur according to the priority order of the policies, with a higher priority policy being evaluated before a lower priority policy. The actual evaluation of a particular policy may entail using a policy to identify tapes which meet that policy by determining which of the tapes meet the criteria defined by the policy. To make such a determination, data corresponding to each tape in the library may be obtained and evaluated according to the criteria defined by the policy. This data may, for example, reside in a tape list stored at the monitoring appliance and comprising data on tapes in library such as time of last verification, comprises a list of each tape in the library and associated information for the tape, including for example, a type of the tape or a result determined for the tape during the verification process, a last verification date specifying when the last verification was performed on the tape, etc.

Identifying information corresponding to tapes meeting one or more policies may be added to a queue of tapes to be verified at step 650. This queue may be a first in, first out (FIFO) queue, such that, in instances where verification policies are used to identify tapes in order of prioritization, tapes identified by higher priority policies may be queued before tapes identified by lower priority verification policies. At the expiration of the next time period then, the policies may once again be evaluated at step 640. In this manner the queue of tapes to be verified is created or updated substantially every time period.

The tapes in the queue may then be verified. Moving now to FIG. 9, one embodiment of a method for the verification of tapes is depicted. At step 710 it can be determined if any resources, such a one or more drives of the library, are available for use in the verification process. This determination may be made using a list of drives in the library and a verification window which specifies which drives may be used for a verification process and when such drives may be used. Thus, each of the drives may have an associated state based on the verification window and the time. These states may comprise, for example, "NOT AVAILABLE," "AVAILABLE, NOT BEING USED" and "CURRENTLY IN USE FOR VERIFICATION." Thus, by determining the state associated with each drive for example, by accessing the state stored in the drive list in association with the drive, or utilizing the verification window, etc., it can be determined if any drives are currently available for use in verification.

If no drives are currently available for verification, at step 720, the process can be paused for an interval before again attempting to determine if any resources are available at step 710. This interval may be a predetermined interval if the process is a watchdog or daemon process, may be an interval determined based on the verification window or the current time, or may be determined based on some other methodology altogether. For example, if the verification window does not designate that any drive will be available for 4 hours the process may sleep for four hours.

Once a drive is identified as being available for use in verification, a tape to be verified using the drive may be determined at step 730. In one embodiment, the first tape in the queue of tapes to be verified may be selected for verification. However, as mentioned, different types of drives may exist in a library. As different types of drives utilize different types of tapes it may be the case that not all tapes in a library may be verified using the identified drive. Thus, in some embodiments, it can be determined if a selected tape may be verified. This determination can be made by comparing the drive type associated with drive which may be stored in a drive list and the type of the tape which may be stored in association with the tape in the tape list. If the available drive and the selected tape are compatible the tape may be verified in the drive. On the other hand if the drive and tape are not compatible another tape may be selected. The next tape selected will, in most cases, be the next tape in the queue. It can then be determined if this tape is compatible with the available drive and so on until a compatible tape, if one exists, is found in the queue.

Once a tape is selected for verification in the available drive, verification of the tape can be performed in the available drive at step 740. It can also be determined if problems occurred during verification at step 750. More specifically, during verification one or more errors may be issued on certain occurrences, such as if a tape cannot be moved (tape removed before RVA verification), a tape return slot was occupied, tape returned to new slot, a drive is unable to verify due to unrecoverable error, changer failures, etc. If such an error occurs, the tape may be placed back in the queue and no attempt may be made to verify this tape for a certain time period. In one embodiment, exponential backoff may be utilized in the verification for this tape such that each time a problem occurs during verification of this tape the time period between attempts at the verification of this tape may be increased in an exponential manner. In one embodiment, a set of rules may be utilized to determine an action to take based on the error returned from the drive. The verification process may be terminated for a variety of reasons at step 760. The termination may occur an end of tape (EOT) was reached, an external trigger to end the verification process may be provided by the user, the verification window may be closed (for example, the verification may go beyond the time period during which the drive being used is designated for verification, an error may occur, or for some other reason). After the termination of the verification of the tape a result to associate with the tape may then be determined at step 770.

FIG. 10 depicts one embodiment of a method for performing such a verification. As discussed above, once it has been determined that a particular tape is to be verified using a particular drive, the actual verification process may occur. To verify a selected tape in a particular drive then, at step 810 a command to load the tape in the drive can be sent to the library. If this load fails a set of rules can be applied to determine an action to take, such as to retry the verification after a certain time period or another action.

If the load command completes without error a command to rewind the tape may then be issued to the drive at step 820. A command to be utilized in the verification process may then be determined at step 830. As discussed above, certain types of drives may not support certain commands. Accordingly, it can be determined what command to use in the verification of a tape based on the drive in which that tape is being verified. More specifically, it can be determined if the drive being utilized support the Verify command. In one embodiment, this determination may be made by attempting to send a Verify command to the drive and determining if any errors indicating an unsupported command are observed. Alternatively, the type of the drive being utilized for verification, which may be stored in association with the drive in a drive list, may be compared against a list of drive types which support the Verify command. Other methods of determining if a drive supports the verify command may also be utilized.

If the drive supports the Verify command, the Verify command may be used to verify the tape by issuing multiple Verify commands to the drive at step 840. Alternatively, if the Verify command is not supported, at step 850, multiple Read commands may be issued to the drive. It will be noted here, that if Read commands are used to verify a tape, data returned in response to the Read command may be disregarded. During and after the verification then, verification data associated with verification process may be obtained and stored (at step 860) in association with the tape (for example, in the tape list). MAM data on the particular cartridge may be collected by sending a Read Attribute command to the drive in which the particular cartridge is located. In response, the drive reads the MAM data from the MAM (which may be, in one embodiment, flash or other memory) on the particular cartridge and the drive returns the MAM data. Additionally, verification data from the drive which read the particular cartridge can be collected by sending one or more Log or a Log Sense command to the drive. In response, the drive returns drive data associated with the particular cartridge. Such data may include read errors (which may include, for example, the number of soft errors logged by the drive or hard errors) associated with a particular tape, utilization and performance data, data regarding the data read from the particular cartridge, detail tables, amount of data read during the verification of the tape, how much compressed data was read during the verification of the tape or other data. It will be noted that such verification data may be stored or consolidated at multiple times during the verification of a tape, for example, after the issuance of each command or after a response is received from the library, etc.

The tape can then be rewound and unloaded at step 870. A result for the verification of the tape can then be determined at step 880 and stored in association with the tape. The determination of a result for a tape may comprise applying one or more rules to the verification data, where the rules apply criteria to the verification data to assign a result. For example, if one or more hard errors have occurred during the verification process for a tape the tape may be associated with a result of FAIL while if no hard errors have occurred the tape may be associated with a result of PASS. Other results and rules will also be possible. For example, the PASS result may be further divided into results of CAUTION, CONCERN or GOOD, based upon the verification data based on an analysis of the verification data, embodiments of which will be discussed in more detail below. A fail result may also have certain subcategories for example, COULDN'T LOAD, COULDN'T READ, etc.

In one embodiment, subcategories of PASS may be determined based on a soft error rate. As discussed above verification data comprising the amount of data read and the number of errors occurring during each of these reads may likewise be obtained. Thus, an error rate comprising the number of errors per gigabyte of tape read may be determined based on the verification data obtained during the verification of that tape. This error rate may be compared to a threshold error rate to determine a subcategory of PASS to associate with a particular tape. This threshold may, for example, be based on the type of the tape and may be associated with the tape itself in a tape list, or otherwise associated with a tape type such that once a type of the tape is determined a threshold for that type of tape may likewise be determined. Using this threshold then a subcategory to associate with the tape can be determined. For example, if the error rate is below the threshold error rate the tape may be assigned a subcategory of GOOD, if the error rate determined for the tape is greater than the threshold but less than twice the threshold the tape may be assigned the subcategory of CAUTION and if the error rate is greater than twice the threshold error rate the tape may be assigned the subcategory of CONCERN.

In the foregoing, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for archive verification of a library having a drive and coupled to a network, the library comprising a plurality of media for data storage, comprising:
a monitoring appliance coupled to the library over a network and configured to:
perform a scheduled initial verification of a first tape media to verify the readability of the first tape media, including loading the first tape media into a first drive allocated for the initial verification of the first tape media and recording a result of the initial verification of the first tape media in a memory;
select the first tape media for subsequent verification of the first tape media based on the result of the initial verification of the first tape media;
performing the subsequent verification of the first tape media to verify the readability for the first tape media, including loading the first tape media into a second drive that was not used for the initial verification of the first tape media and recording a result of the subsequent verification of the first tape media in the memory; and
determine a verification result for the first tape media based on an analysis of the result of the initial verification of the first tape media and the result of the subsequent verification of the first tape media.

2. The system of claim 1, wherein performing the initial verification of the first tape media comprises sending READ or VERIFY commands to the tape library.

3. The system of claim 1, wherein performing the subsequent verification of the first tape media comprises sending READ or VERIFY commands to the tape library.

4. The system of claim 1, wherein the monitoring appliance is further configured to:
perform an initial verification of a second tape media to verify the readability of the second tape media, including loading the second tape media into the first drive and recording a result of the initial verification of the second tape media in the memory;
perform a subsequent verification of the second tape media, including loading the second tape media into the second drive and recording a result of the subsequent verification of the second tape media in the memory;
determine a verification result for the second tape media based on the result of the initial verification of the second tape media and the result of the subsequent verification of the second tape media to determine one or more of a tape drive health, an efficacy of the first tape media or the second tape media, an efficacy of the first drive or the second drive, and whether to replace the first tape media or the second tape media.

5. The system of claim 1, wherein selecting the first tape media for the subsequent verification of the first tape media comprises determining that the result of the initial verification of the first tape media meets a criteria of a verification rule.

6. The system of claim 5, wherein the criteria comprises a threshold number of errors.

7. The system of claim 6, wherein the monitoring appliance comprises:

a first memory for storing a queue of media tapes for verification;
a second memory storing an archive verification engine; and
a processor for executing a set of instructions stored in the first memory or the second memory.

8. A method for archive verification of a library having a drive and coupled to a network, the library comprising a plurality of media for data storage, the method comprising:
performing a scheduled initial verification of a first tape media to verify the readability of the first tape media by a monitoring appliance coupled to a library over the network, including instructing the library to load the first tape media into a first drive allocated for the initial verification of the first tape media and recording a result of the initial verification of the first tape media in a memory;
selecting the first tape media for subsequent verification of the first tape media based on the result of the initial verification of the first tape media;
performing a subsequent verification of the first tape media to verify readability of the first tape media by the monitoring appliance, including instructing the library to load the first tape media into a second drive that was not used for the initial verification of the first tape media and recording a result of the subsequent verification of the first tape media in the memory; and
determining a verification result for the first tape media based on an analysis of the result of the initial verification of the first tape media and the result of the subsequent verification of the first tape media.

9. The method of claim 8, wherein performing the initial verification of the first tape media comprises sending READ or VERIFY commands to the tape library.

10. The method of claim 8, wherein performing the subsequent verification of the first tape media comprises sending READ or VERIFY commands to the tape library.

11. The method of claim 8, further comprising:
performing an initial verification of a second tape media to verify readability of a second tape media by the monitoring appliance, including instructing the library to load the second tape media into the first drive and recording a result of the initial verification of the second tape media in the memory;
performing a subsequent verification of the second tape media to verify readability for the second tape media by the monitoring appliance, including instructing the library to load the second tape media into the second drive and recording a result of the subsequent verification of the second tape media in the memory,
determining a verification result for the second tape media based on the result of the initial verification of the second tape media and the result of the subsequent verification of the second tape media to determine one or more of a tape drive health, an efficacy of the first tape media or the second tape media, an efficacy of the first drive or the second drive, and whether to replace the first tape media or the second tape media.

12. The method of claim 11, wherein selecting the first tape media for the subsequent verification of the first tape media comprises determining that the result of the initial verification of the first tape media meets a criteria of a verification rule.

13. The method of claim 12, wherein the criteria comprises a threshold number of errors.

14. The method of claim 13, wherein the monitoring appliance comprises:

a first memory for storing a queue of media tapes for verification;

a second memory storing an archive verification engine; and a processor for executing a set of instructions stored in the first memory or the second memory.

15. A computer program product comprising a non-transitory computer-readable medium storing a set of instructions executable to verify readability of a library having a drive and coupled to a network, the library comprising a plurality of media for data storage, the method comprising:

performing a scheduled initial verification of a first tape media to verify readability of a first tape media by a monitoring appliance coupled to a library over the network, including instructing the library to load the first tape media into a first drive allocated for the initial verification of the first tape media and recording a result of the initial verification of the first tape media in a memory;

selecting the first tape media for subsequent verification of the first tape media based on the result of the initial verification of the first tape media;

performing a subsequent verification of the first tape media to verify readability for the first tape media by the monitoring appliance, including instructing the library to load the first tape media into a second drive that was not used for the initial verification of the first tape media and recording a result of the subsequent verification in the memory; and comparing the result of the initial verification to the result of the subsequent verification to verify the readability of the first tape media.

16. The computer program product of claim 15, wherein performing the initial verification of the first tape media comprises sending READ or VERIFY commands to the tape library.

17. The computer program product of claim 15, wherein performing the subsequent verification of the first tape media comprises sending READ or VERIFY commands to the tape library.

18. The computer program product of claim 15, further comprising:

performing an initial verification of a second tape media to verify readability of the second tape media by the monitoring appliance, including instructing the library to load the second tape media into the first drive and recording a result of the initial verification of the second tape media in the memory;

performing a subsequent verification on the second tape media to verify readability for the second tape media by the monitoring appliance, including instructing the library to load the second tape media into the second drive and recording a result of the subsequent verification in the memory;

determining a verification result for the second tape media based on the result of the initial verification of the second tape media and the result of the subsequent verification of the second tape media to determine one or more of a tape drive health, an efficacy of the first tape media or the second tape media, an efficacy of the first drive or the second drive, and whether to replace the first tape media or the second tape media.

19. The computer program product of claim 18, wherein selecting the first tape media for the subsequent verification of the first tape media comprises determining that the result of the initial verification of the first tape media meets a criteria of a verification rule.

20. The computer program product of claim 19, wherein the criteria comprises a threshold number of errors.

* * * * *